US006615271B1

(12) United States Patent
Lauck et al.

(10) Patent No.: US 6,615,271 B1
(45) Date of Patent: *Sep. 2, 2003

(54) TRAFFIC CONTROL SYSTEM HAVING DISTRIBUTED RATE CALCULATION AND LINK FLOW CONTROL

(75) Inventors: Anthony G. Lauck, Wellesley, MA (US); Anna Charny, Sudbury, MA (US); Kadangode K. Ramakrishnan, Maynard, MA (US)

(73) Assignee: Enterasys Networks, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/421,021

(22) Filed: Oct. 19, 1999

Related U.S. Application Data

(60) Continuation of application No. 08/845,336, filed on Apr. 25, 1997, now Pat. No. 5,968,128, which is a division of application No. 08/276,291, filed on Jul. 18, 1994, now Pat. No. 5,734,825.

(51) Int. Cl.[7] .............................................. G06F 15/16
(52) U.S. Cl. ....................................................... 709/232
(58) Field of Search .............................. 709/232, 233, 709/234, 235, 249, 203; 370/236

(56) References Cited

U.S. PATENT DOCUMENTS

| 5,029,164 | A | * | 7/1991 | Goldstein et al. ........... 370/235 |
| 5,276,677 | A | | 1/1994 | Ramamurthy et al. ...... 370/232 |
| 5,319,638 | A | | 6/1994 | Lin ............................. 370/235 |
| 5,367,523 | A | | 11/1994 | Chang et al. ................ 370/235 |
| 5,416,771 | A | | 5/1995 | Iwata ........................... 370/410 |
| 5,432,784 | A | | 7/1995 | Ozveren ...................... 370/235 |
| 5,436,891 | A | | 7/1995 | Grossman et al. ........... 370/231 |
| 5,455,826 | A | | 10/1995 | Ozveren et al. ............. 370/232 |
| 5,457,687 | A | | 10/1995 | Newman ...................... 370/232 |
| 5,491,801 | A | * | 2/1996 | Jain et al. .................... 709/241 |
| 5,497,375 | A | | 3/1996 | Hluchyj et al. .............. 370/235 |
| 5,734,825 | A | * | 3/1998 | Lauck et al. ................. 709/233 |
| 5,745,697 | A | | 4/1998 | Charny et al. .......... 395/200.63 |
| 5,968,128 | A | * | 10/1999 | Lauck et al. ................. 709/232 |

FOREIGN PATENT DOCUMENTS

| EP | 0413488 A2 | 6/1990 |
| EP | 0603099 A2 | 4/1993 |

OTHER PUBLICATIONS

Backward explicit congestion notification for ATM local area network by Newman, 1993 IEEE publication, pp. 719–723.

European Search Report, EP 95 30 4994, Oct. 19, 1995.

An algorithm for rate allocation in a packet–switching network with feedback by Anna Charny, Masters Thesis, Massachusetts Institute of Technology, May 1994.

* cited by examiner

Primary Examiner—Zarni Maung
(74) Attorney, Agent, or Firm—Wolf, Greenfield & Sacks, P.C.

(57) ABSTRACT

A rate based, end to end flow control system is disclosed for a communications network. The disclosed rate based flow control system includes each source end station selecting its transmission rate from a set of permitted discrete transmission rates. The set of permitted discrete transmission rates is based on a logarithmic encoding. The disclosed rate based traffic control system further requires each source end station to send one end to end control cell every time period T. The time period T is also known by switches in the communications network and is used to periodically calculate an available allocation ("fair share") of bandwidth at a switch for a given virtual circuit.

6 Claims, 14 Drawing Sheets

SOURCE DATA STRUCTURE

SWITCH DATA STRUCTURE 1
SWITCH RATE TABLE

SUB-PROCESSES WITHIN RATE CONTROL
PROCESS IN SOURCE END STATION

STEPS OF RATE CONTROL PROCESS IN
SOURCE END NODE TO UPDATE
SOURCE DATA STRUCTURE RESPONSIVE TO
A RECEIVED END TO END CONTROL CELL

STEPS OF PERIODIC UPDATE
PROCESS IN SWITCH

STEPS OF RATE CONTROL INFORMATION
PROCESS IN SWITCH

END TO END
CONTROL CELL FIELDS

| | | | INITIALIZED |
|---|---|---|---|
| 1202 — | RECORDED RATE | (R) | 0 |
| 1204 — | ACTUAL BUFFER ALLOCATION | (BA) | N2 |
| 1206 — | VIRTUAL BUFFER ALLOCATION | (VBA) | N2 |
| 1208 — | BUFFER USED | (BU) | 0 |
| 1220 — | TOTAL # DATA CELLS TRANSMITTED DOWNSTREAM | (NTx) | 0 |
| 1222 — | TOTAL # DATA CELLS RECEIVED FROM UPSTREAM NODE | (NRx) | 0 |
| 1224 — | CREDIT BALANCE | (CB) | N2 |
| 1226 — | MIN BUFFER ALLOCATION | (N2) | — |
| 1228 — | OUTGOING LINK RTT | (RTT) | — |
| 1240 — | OUTGOING LINK BANDW. | (BW) | — |
| 1242 — | LOCAL COUNTER n | | 0 |

*FIG. 12*

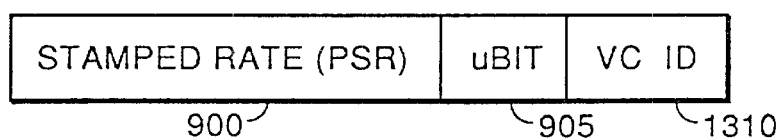

END TO END CONTROL CELL WITH
HOP-BY-HOP CREDIT HYBRID METHOD

*FIG. 13*

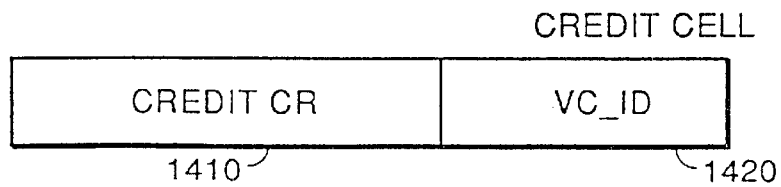

*FIG. 14*

HOP-BY-HOP FLOW CONTROL
PROCESSES AT THE SWITCH

TRAFFIC CONTROL SYSTEM HAVING DISTRIBUTED RATE CALCULATION AND LINK FLOW CONTROL

This application is a continuation application of prior application Ser. No.: 08/845,336 filed Apr. 25, 1997 which issued on Oct. 19, 1999 as U.S. Pat. No. 5,968,128, which was a divisional of Ser. No. 08/276,291 filed Jul. 18, 1994 and which issued as U.S. Pat. No. 5,734,825 on Mar. 31, 1998.

FIELD OF THE INVENTION

This invention relates generally to avoiding congestion in computer networks, and more particularly to limiting a transmission rate of end stations in order to avoid congestion at intermediate links.

BACKGROUND

As computer networks become increasingly more complex, more and more end stations communicate through more and more intermediate links. An intermediate link is typically a section of network cable with nodes or network switches at each end of the cable. A link can carry only a predetermined amount of network traffic, usually expressed as a bit per second limit. Network traffic is typically referred to as packets or cells, and each packet or cell requires a number of bits to be transmitted over the network.

For example, an intermediate link may carry traffic originating at numerous source end stations. And each source end station may be capable of generating network traffic at a rate in excess of what the intermediate link can handle without dropping packets. That is, each individual end station may be capable of driving an intermediate link into congestion. Accordingly, when a plurality of end stations are creating network traffic, and all of that traffic passes through a particular intermediate link, it is clear that a mechanism must be installed to limit the traffic created by the source end stations. Flow control is the generic term used to describe a mechanism to limit traffic created by source end stations.

Fairness in allocation of link capacity to various source end stations is another consideration which flow control must address. If one source end station uses the entire capacity of an intermediate link, then no other source end station can transmit. Congestion management systems provide each source end station with an opportunity to transmit, even though transmissions are at a rate reduced from what the source end station desires.

In many networks, particularly connection oriented networks, substantially stable routes are established for transfer of packets from a selected source end station to a selected destination end station. Typically, such stable routes are referred to as sessions or as virtual circuits. A virtual circuit is a path through intermediate links and nodes between a designated source end station and a designated destination end station. Each packet carries a designation of the virtual circuit, and each intermediate node maintains state information so that it can examine the virtual circuit designation in a received packet and accordingly forward the packet onto an appropriate downstream link.

Two common types of flow control typically utilized in networks having stable routes such as virtual circuits are, firstly, end-to-end flow control, and secondly, hop-by-hop flow control.

End-to-end flow control typically has a destination end station detect that congestion is occurring in the network. A destination end station may detect congestion by an intermediate node inserting a flag into a forwarded packet, where the flag informs the destination end station that the intermediate node's buffers are filling or that the intermediate node is otherwise experiencing congestion. The destination end station then places congestion information in an acknowledgement packet returned to the source end station, and the source end station reacts to the congestion information by reducing the rate which the source end station transmits packets onto the network.

A further refinement of end-to-end flow control is to transfer control packets along a virtual circuit from a source station, through the network to a destination station, and in response the destination station returns the control packet to the source station along the virtual circuit. As the control packet passes through the network, link capacity information is written into the control packet as it passes through each link of the virtual circuit. Each node at each link along the virtual circuit then maintains a table giving transmission rate information pertaining to each virtual circuit passing through that node.

Problems with a method of computing a transmission rate for each virtual circuit is that each intermediate node must keep a table containing state information for each virtual circuit passing through. Further, when a change occurs in the network, such as a new virtual circuit is established or an old virtual circuit is dropped, the network must respond rapidly to the change. Response to a change, in past attempts to apply end-to-end flow control, require a convergence time which is too long. For example, the worst case convergence time in many past systems is proportional to the number of virtual circuits, in addition to the dominant (or maximum) round trip time. Such long convergence times are not acceptable for efficient congestion management.

Secondly, hop-by-hop flow control is next discussed. In hop-by-hop flow control a downstream node uses a mechanism to inform an immediate upstream node to limit the rate at which the upstream node transmits packets to the downstream node. A typical mechanism used by the downstream node to limit the rate at which packets are transmitted by the upstream node, is the issuance of credits. Credits issued by the downstream node reflect the number of buffers in the downstream node. Credit information is sent in a control packet to the upstream node. The upstream node is permitted to send only the number of packets for which it has credits, and the upstream node decrements its credit count as it sends a packet. When the downstream node receives a packet the packet is stored in a buffer, and later the buffer is drained by the downstream node further processing the packet. As packets are forwarded by the downstream node, the downstream node sends credit information to the upstream node. Accordingly, the upstream node receives and uses credits to control the rate at which it transmits packets (or cells) to the downstream node. All of the nodes in the network use the hop-by-hop credit based flow control, and so permit their source stations to send only the number of packets which each node can handle.

Hop-by-hop flow control has been implemented by using either static buffering or dynamic buffering. In static buffering, sufficient buffers for each virtual circuit to fully occupy each link must be provided. Each individual virtual circuit may be capable of fully using the capacity of an intermediate link. Accordingly, each virtual circuit must have enough buffers assigned for it to fully use the capacity of the link. When many virtual circuits are established, the number of buffers needed becomes excessive. For example, in a transmission protocol referred to as Asynchronous Transfer Mode, or ATM, there are 24 bits assigned to designate a virtual circuit. Accordingly the number of possible virtual circuits is $2^{24}$. It is not practical to provide buffering at full link capacity for so many virtual circuits. And one never knows which of these virtual circuits will require buffering at full link capacity.

Secondly, when dynamic buffering is used, in a particular intermediate node, a pool of buffers is assigned for all of the virtual circuits passing through that node. Some of the buffers are allocated to each virtual circuit as they are needed. A problem is that when the network changes by adding or subtracting a virtual circuit, the system is very slow in responding to the change. For example, when a new virtual circuit is added, there may be no buffers available to be assigned to the new virtual circuit, as they may already be full from their previous assignment. The buffers drain slowly. Accordingly, the new virtual circuit must wait for a long time before it can begin transmission. Such long waits are unacceptable in efficient network management.

There is needed a flow control system capable of scaling to a large number of virtual circuits, capable of responding quickly to a change in the number of established virtual circuits, capable of responding to the different requirements of many different source end stations, and capable establishing a fair allocation of network resources to all of the source end stations.

SUMMARY

A system for controlling a transmission rate of a source station on a computer network has: a control cell transmitter for transmitting a control cell onto the computer network, the control cell travelling in an established virtual circuit, the control cell having a stamped transmission rate written into a stamped rate field, and having a control u_bit value written into a u_bit field; a selector in a network switch to select a fair transmission rate for the virtual circuit; a receiver in a network switch to receive the control cell on an incoming link of the network, and for reading the stamped transmission rate and the u_bit value; a processor in a network switch to write a new stamped transmission rate into the stamped rate field of the control cell before transmitting the control cell onto the outgoing link, the new stamped transmission rate computed in response to the received stamped rate and the fair transmission rate, and for writing a value into the u_bit field of the outgoing control cell to indicate whether the new stamped transmission rate differs from the received stamped rate; a receiver in a destination station to receive the control cell and to send a return cell containing a value received by the destination station in the stamped rate field and in the u_bit field; a receiver in the source station to receive the return cell and to read a returned stamped rate and a returned u_bit value; transmission rate controller in the source station to set a new rate for transmission of a plurality of data cells by the apparatus in response to the returned stamped rate and the returned u_bit value. The system implements the above method by a global timing means located in each source station and in each switch for timing events, to time in a source station sending of one control cell for each virtual circuit established in the source station and to time in a switch the calculation of a fair transmission rate; and by discrete transmission rate generating means for calculating a plurality of permitted discrete transmission rates, and for requiring that all stamped transmission rates written into the control cell and all fair transmission rates are selected as one rate of the plurality of permitted discrete transmission rates. The system further maintains state information in each switch such that only the plurality of permitted discrete transmission rates and the number of source end stations transmitting at each permitted discrete transmission rate are maintained. Thus the system alleviates the need to maintain functionally equivalent state information in each switch on a per virtual circuit basis.

A system for selecting transmission rates for a plurality of source stations having: selection means for establishing a feasible transmission rate for each source station on all established virtual circuits, the feasible rates defined as a transmission rate for each source station such that the sum of all transmission rates of all virtual circuits passing through a link do not exceed the capacity of the link, for all links in the network; means for allocating available buffers among virtual circuits passing through the link; means for allocating buffers to the virtual circuits such that the proportions of allocated buffers are equal to the proportions of the feasible transmission rates of the virtual circuits; and having hop-by-hop flow control means for dynamically allocating buffers in a network switch to permit the source stations to transmit data cells at a transmission rate in excess of the feasible transmission rates.

These and other features and advantages of the present invention will become apparent from a reading of the detailed description in conjunction with the attached drawings in which like reference numerals refer to like elements in the several views.

BRIEF DESCRIPTION OF THE DRAWINGS

FIG. 12 is a field diagram for fields of the Switch Credit Table of FIG. 11.

FIG. 13 is a field diagram of data in an end-to-end control cell, when used with hop-by-hop credit based flow control;

FIG. 14 is a field diagram of data in a credit cell used for hop-by-hop credit based flow control;

DETAILED DESCRIPTION
Rate Based End To End Traffic Control System

FIGS. 1 through 9 show elements of a system for end to end, rate based traffic control in a communications network. The disclosed rate based traffic control system requires each source end station to select its transmission rate from a set of permitted discrete transmission rates. The set of permitted discrete transmission rates is based on a logarithmic encoding. The disclosed rate based traffic control system further requires each source end station to send one end to end control cell every time period T. The time period T is also known by switches in the communications network, and is used to periodically calculate an available allocation (or "fair share") of bandwidth at a switch for a given virtual circuit.

Figure 1:
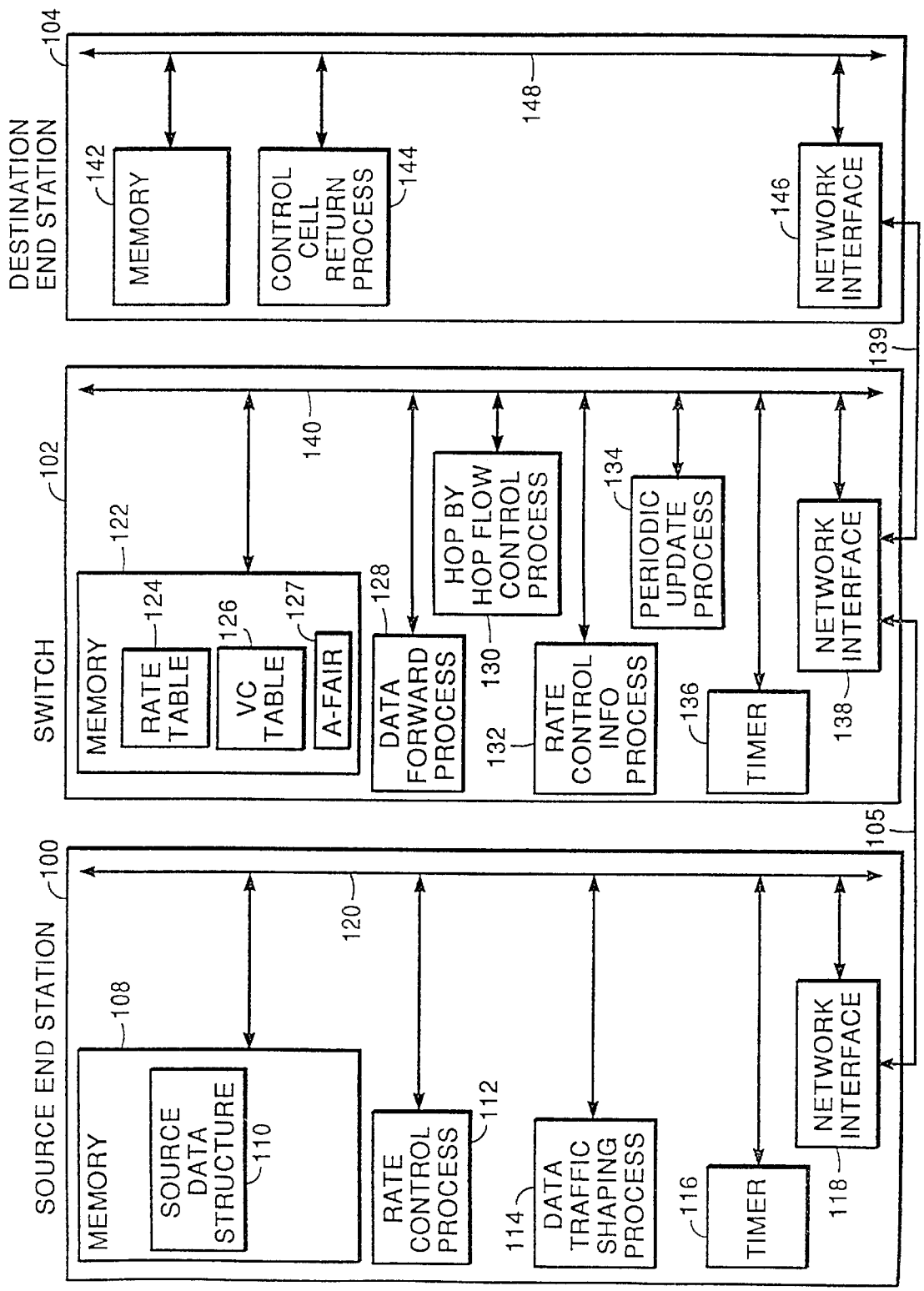
FIG. 1 is a diagram showing an example embodiment of the elements in a traffic control system.

FIG. 1 shows an example embodiment of the elements in a rate based traffic control system. FIG. 1 includes a source end station 100, a switch 102, and a destination end station 104. Source end station 100 is coupled with switch 102 via communications link 105, and destination end station 104 is coupled with switch 102 via communications link 139.

During operation of the elements shown in FIG. 1, there are multiple virtual circuits originating at the source end station 100. The route of each virtual circuit is predetermined and the determination of each route is outside the scope of the disclosed system. For purposes of example, one or more of the virtual circuits originating at source end station 100 is with destination end station 104.

The example of FIG. 1 shows a single switch 102 along the route between source end station 100 and destination end station 104. However, the disclosed system is also applicable where the source end station and destination end station communicate over a virtual circuit having a route including multiple switches. The disclosed system is further applicable where there are multiple source end stations having virtual circuits through a single switch. The disclosed system is similarly useful in networks where there are multiple switches, in which even more complex configurations of merging and branching traffic flows exist.

Source end station 100 is shown having a memory 108, a rate control process 112, a data traffic shaping process 114, a timer 116, and a network interface 118. The memory 108 is shown having a source data structure 110. The memory 108 and network interface 118 are coupled with a bus 120. The network interface 118 is further coupled with switch 102 via a communications link 105. For purposes of example, rate control process 112 and data traffic shaping process 114 are processes in one or more Application Specific Integrated Circuits (ASICs). Accordingly, the one or more ASICs are coupled with the bus 120.

Alternatively, rate control process 112 and data traffic shaping process 114 may be processes executing on a microprocessor within the source end station 100. Similarly, in the alternative, the microprocessor is coupled with the bus 120.

The switch 102 is shown having a memory 122, a data forwarding process 128, a hop by hop flow control process 130, a rate control information process 132, a periodic update process 134, a timer 136, and a network interface 138. The memory 122 is shown having a rate table 124, a virtual circuit table 126, and an A-fair variable 127. The memory 122, timer 136, and network interface 138 are coupled with a bus 140. The network interface 138 is further coupled with the source end station 100 via communications link 105. The network interface 138 is also coupled with the destination end station 104 via communications link 139. For purposes of example, the data forwarding process 128, hop by hop flow control process 130, rate control information process 132, and periodic update process 134 are processes within one or more Application Specific Integrated Circuits (ASICs). Accordingly, the one or more ASICs are coupled with the bus 140.

Alternatively, the data forwarding process 128, hop by hop flow control process 130, rate control information process 132, and periodic update process 134 are processes executing on a microprocessor in the switch 102. Similarly, in the alternative, the microprocessor is coupled with the bus 140.

The destination end station 104 includes a memory 142 and a network interface 146, both coupled with a bus 148. The network interface 146 is further coupled with the switch 102 via communications link 139. For purposes of example, the control cell return process 144 is a process within one or more Application Specific Integrated Circuits (ASICs). Accordingly, the one or more ASICs are coupled with the bus 148.

Alternatively, the control cell return process 144 is a process executing on a microprocessor in the switch 102. Similarly, in the alternative, the microprocessor is coupled with the bus 148.

Figure 2:
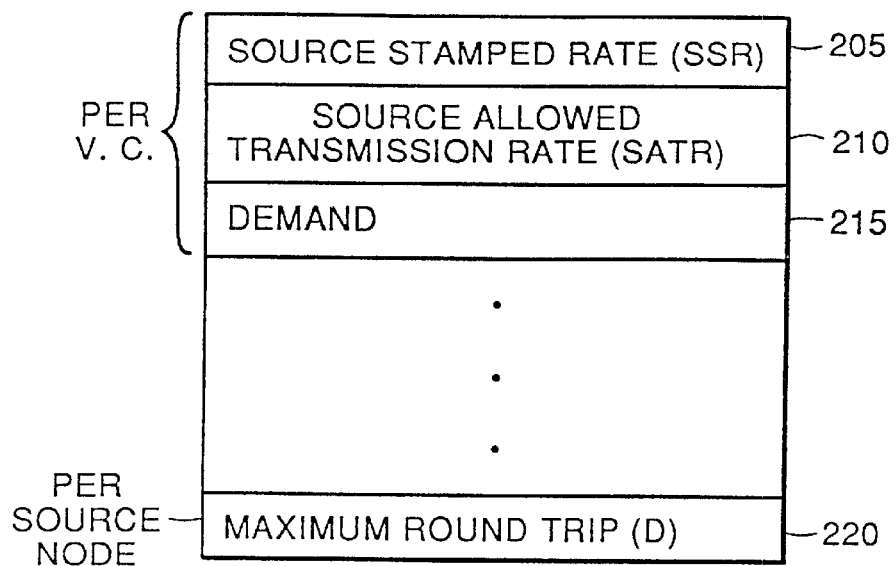
FIG. 2 is a diagram of an example embodiment of a source data structure in a source end station.

FIG. 2 shows an example embodiment of the contents of source data structure 110 shown in the source end station 100 of FIG. 1. For each virtual circuit of the end station 100 over communications link 105, there are three associated fields in the source data structure: source stamped rate (SSR), source allowed transmission rate (SATR), and demand rate (demand). Thus for a given virtual circuit there is shown a source stamped rate 205, a source allowed transmission rate 210, and a demand rate 215.

Also shown in FIG. 2 is a maximum round-trip field 220. While there is one maximum round-trip field 220 per source end station 100, the value stored in the maximum round-trip field 220 in all nodes in the network is equal to the longest round trip time in the network.

The value of the demand field for a given virtual circuit is initialized to a maximum data rate requested by a user of that virtual circuit. If the maximum data rate is unknown, then the value of the demand field for the virtual circuit is initialized to infinity.

The source allowed transmission rate for a given virtual circuit is the transmission rate limit for that virtual circuit. The data traffic shaping process 114 as shown in FIG. 1 controls the transmission rate on each virtual circuit responsive to the contents of the source allowed transmission rate field for that virtual circuit, so that the actual transmission rate for a virtual circuit does not exceed the virtual circuit's source allowed transmission rate. The value of the source allowed transmission rate field at any given time is equal to one of the set of permitted discrete transmission rates. Each one of the set of permitted discrete transmission rates corresponds with one of the switch rate table entries as shown and described in FIG. 3.

At initialization of the elements shown in FIG. 2, the source stamped rate field (SSR) for each virtual circuit is set equal to the demand for that virtual circuit, and the source allowed transmission rate is set to a predetermined value. The source allowed transmission rate may initially be set to a minimum value that will allow for minimal acceptable progress for a virtual circuit that is successfully set up. If the data traffic shaping process transmits initially at the predetermined minimal value of the source allowed transmission rate for a virtual circuit, this may result in temporary infeasibility of the actual transmission rate of that virtual circuit. This effect may be overcome if the data traffic shaping process initially delays transmission on a newly established virtual circuit for a time period equal to 2*(D+T), where D is the maximum round trip delay in the network.

Figure 3:
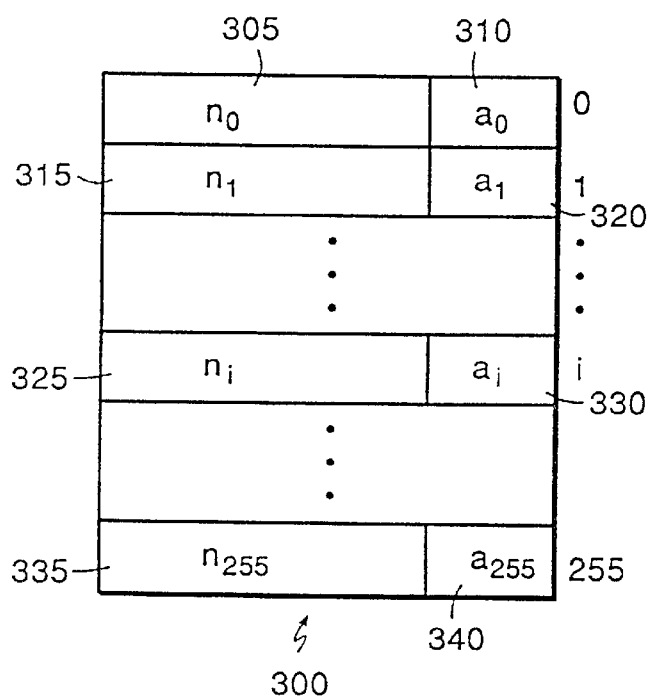
FIG. 3 is a diagram of an example embodiment of a rate table.

FIG. 3 shows a rate table 300, which is an example embodiment of the rate table 124 shown in the switch 102 of FIG. 1. Each entry in the rate table 124 corresponds with one of a predetermined set of permitted discrete transmission rates. The actual transmission rates of source end stations are also selected from the predetermined set of permitted discrete transmission rates. The predetermined set of permitted discrete transmission rates are represented using a logarithmic encoding in the rate table 124 as described below. The example of FIG. 3 provides 256 discrete rates approximately 9% apart and ranging from 1 bit per second to 3.9 gigabits per second.

The rate table 300 of FIG. 3 includes 256 entries, having indices of i=0 through 255. For each entry having index i in the rate table 300, there is a count field $n_i$ and a bit $a_i$. Each entry in the rate table 300 corresponds with a discrete transmission rate given by the following equation:

$$2^{0.125 \cdot i}$$

During operation, the count field $n_i$ is used by the rate control information process 132 to count the number of end to end control cells having a stamped rate field (PSR) value equal to the discrete transmission rate associated with that entry, and received by the switch 102 during the last time period T. The field $a_i$ is set to one by the rate control information process 132 if at least one end to end control cell was received during the time period T, and contained a stamped rate field (PSR) value equal to the discrete transmission rate associated with that entry, and that stamped rate field (PSR) value was less than or equal to the current value of the A-fair variable 127.

Initially, the values of all 'a' and 'n' fields are set to zero. The $n_i$ and $a_i$ fields may be modified during operation of the periodic update process 134 in FIG. 1 which is described in detail in FIG. 7. Initially A-fair 127 is set to C/N, where C is the total link capacity at that switch, and N is the number of virtual circuits passing through the switch. The value N may be determined as the sum of all counter field values $n_i$ in the switch table accumulated over one time period T.

The discrete rates associated with the entries in the switch rate table 300 in FIG. 3 are shown for purposes of example. In alternative embodiments, a different set of permitted discrete rates is used to correspond with the set of entries in the switch table 300.

Figure 4:
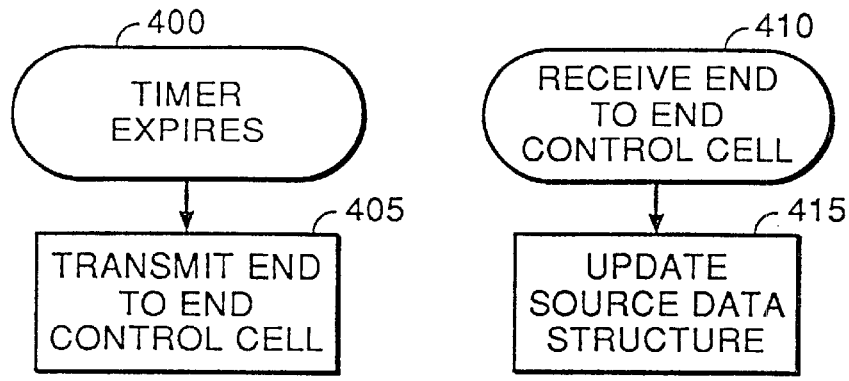
FIG. 4 is a diagram showing the steps performed by an example embodiment of a rate control process in a source end node.

FIG. 4 shows the steps performed by two independent sub-processes in an example embodiment of the rate control process 112 shown in the source end station 100 as in FIG. 1. Steps 400 and 405 are a first independent sub-process, and steps 410 and 415 are a second independent sub-process.

In step 400 of FIG. 4, the rate control process detects the expiration of the timer 116 as shown in FIG. 1. The duration of the timer 116 is T. The duration of the timer 136 shown in the switch 102 in FIG. 1 is also equal to T. While the timer 136 and the timer 116 need not be synchronized, they must be largely equal in duration. Small amounts of clock skew or drift in these timers may be acceptable.

Several considerations are now given for selecting a value for the time period T. The larger the value of T, the smaller the amount of bandwidth that is consumed by control traffic. However, larger values of T also result in longer convergence time for the system. Below are three additional considerations that are useful in choosing the right value of T.

1. Control traffic should not consume more than a certain percentage of the bottleneck capacity, and should not be congested itself. This leads to the following inequality:

$$T >= c*len/r_{min}$$

where $r_{min}$ is the minimal allocated rate in bits per second, for all control traffic at any link in the network, len is the control packet length in bits, and c is the desired upper bound on the ratio of the bottleneck bandwidth consumed only by the end to end control cells.

2. To ensure that the system is stable to packet loss, the time L between two consecutive losses of control packets must be greater than the algorithm convergence time CT. The theoretical upper bound on convergence time is known and is CT<=4*N*(L*D+T), where N is the number of different rates in the optimal rate vector, and D is the maximum round trip delay in the network. In the system herein disclosed, N<=256 for the set of permitted transmission rates. These considerations lead to $$T<(L/4*N)-D$$

Note that for low loss networks L is large and the right side of this inequality is also large.

3. The herein disclosed system relies on the fact that the time period T is frequency-synchronized throughout the network. The clock skew in the various clocks with period T throughout the network may be such that the absolute values of T are slightly different. However, if the maximum skew is bounded by S, the algorithm will remain stable if T is chosen such that:

$$T>4*N*S$$

If the clock skew limit s is kept small enough, the right side of the above relationship can be kept low as well.

Figure 5:
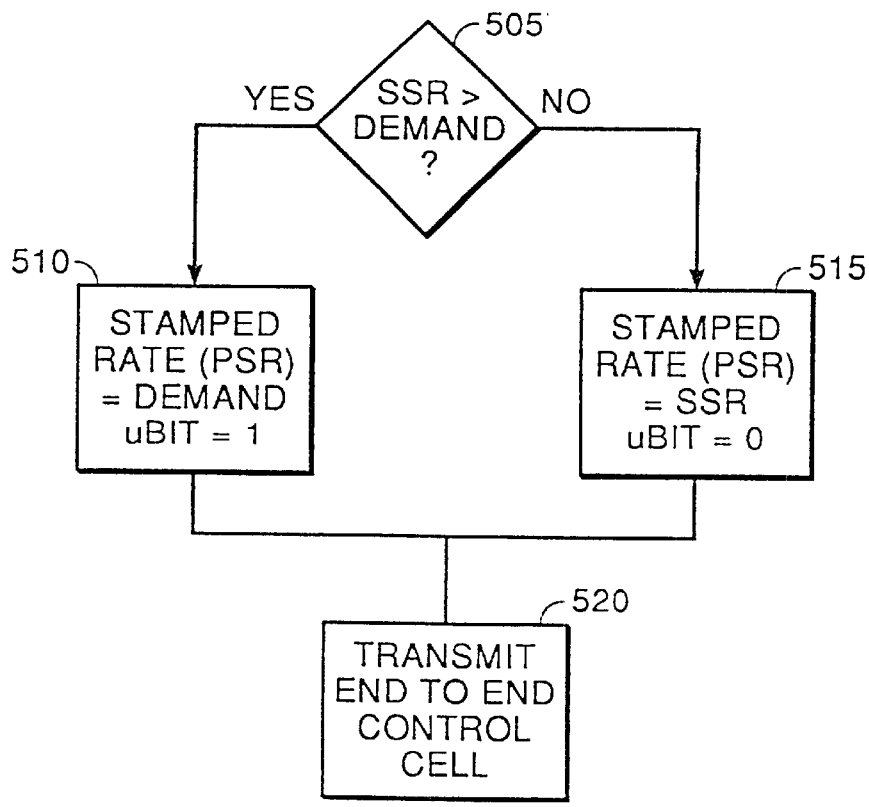
FIG. 5 is a diagram showing steps performed by an example embodiment of a source end station to transmit an end to end control cell.
Figure 9:
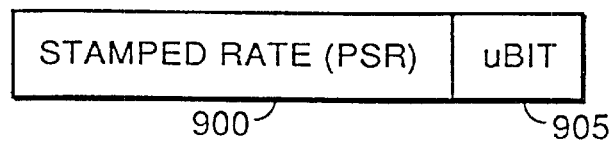
FIG. 9 is a diagram showing an example of fields within an end to end control cell.

Now continuing with the description of the elements shown in FIG. 4, following detection of the timer expiration in step 400, the rate control process transmits an end to end control cell in step 405. The rate control process uses the network interface 118 as shown in FIG. 1 to transmit the end to end control cell. The fields of the end to end control cell transmitted in step 405 are shown in FIG. 9. The values of the fields in the end to end control cell transmitted in step 405 are determined by the rate control process responsive to source data structure 110 as shown in FIG. 1. The steps for determining the values of the fields in the end to end control cell are shown in FIG. 5. The end to end control cell sent on a given virtual circuit. The fields of the end to end control cell may be modified by switches along the route between the source end station and the destination end station. When the destination end station receives the end to end control cell transmitted in step 405, it transmits the end to end control cell back to the source end station.

In step 410, the rate control process receives an end to end control cell. The rate control process uses the network interface 118 to receive the control cell. After step 410, in step 415, the rate control process updates the contents of the source data structure 110 as shown in FIG. 1, responsive to the contents of the fields in the control packet received in step 410.

FIG. 5 shows the steps performed by an example embodiment of a source end station to transmit an end to end control cell on a virtual circuit. The steps shown in FIG. 5 are performed by the rate control process 112 as shown in FIG. 1, and correspond with step 405 as shown in FIG. 4.

In step 505 the rate control process compares the value of the source stamped rate (SSR) field for the virtual circuit to the value of the demand field for the virtual circuit. The source stamped rate (SSR) field is shown as element 205 in FIG. 2. The demand field is shown as element 215 in FIG. 2. If the source stamped rate field value is greater than the demand field value, step 505 is followed by step 510. If the source stamped field value is not greater than the demand field value, step 505 is followed by step 515.

In step 515 the rate control process sets the stamped rate field (PSR) of the end to end control cell equal to the value of the source stamped rate (SSR) field for the virtual circuit on which the end to end control cell is to be transmitted. Also in step 515, the rate control process sets the value of the Ubit in the end to end control cell to 0. Step 515 is followed by step 520.

In step 510, the rate control process sets the stamped rate field (PSR) of the end to end control cell equal to the value of the demand field for the virtual circuit on which the end to end control cell is to be transmitted. Also in step 510, the rate control process sets the value of the Ubit in the end to end control cell to one. Step 510 is followed by step 520. In step 520, the rate control process transmits the end to end control cell.

Figure 6A:
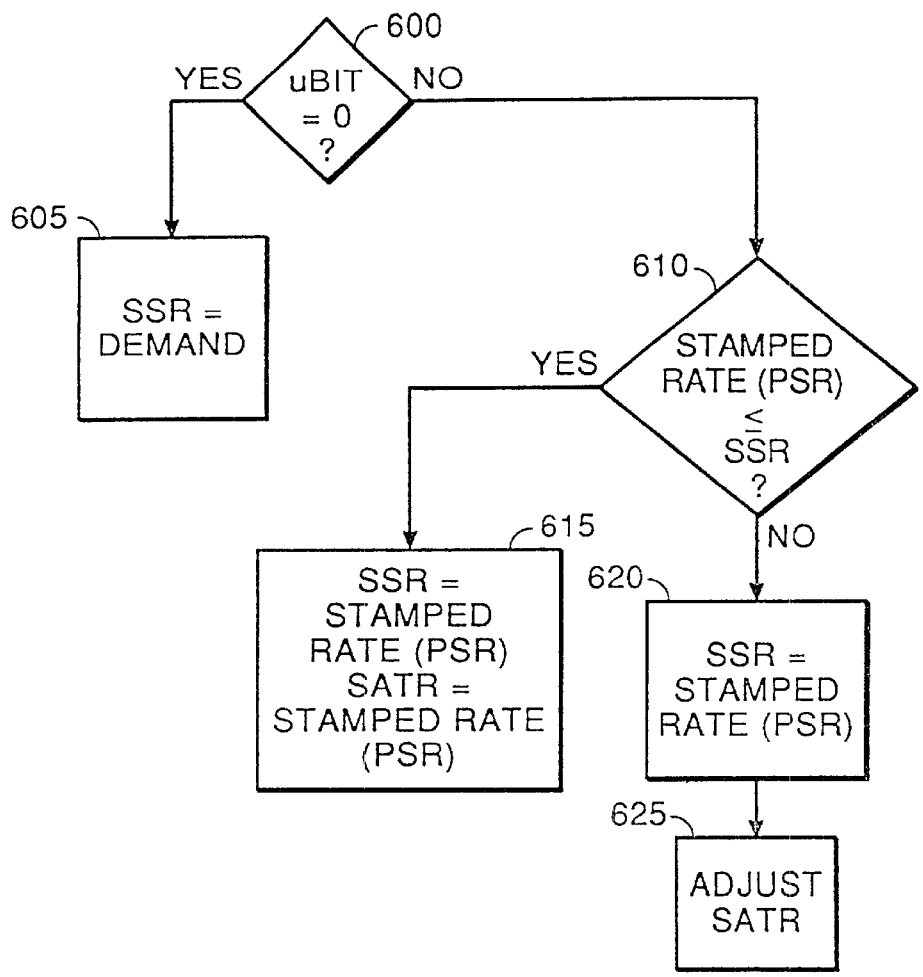
FIG. 6A is a diagram showing steps performed by an example embodiment of a source end station to update a source data structure in response to receipt of an end to end control cell.

FIG. 6A is a diagram showing steps performed by an example embodiment of a source end station to update a source data structure in response to receipt of a control cell. The steps shown in FIG. 6A are performed by the rate control process 112 as shown in FIG. 1, and correspond with step 415 as shown in FIG. 4.

In step 600 the rate control process 112 determines whether the Ubit value in the end to end control cell received in step 410 in FIG. 4 is equal to zero. If the Ubit value is equal to zero, step 600 is followed by step 605. If the Ubit value is not equal to zero, step 600 is followed by step 610. In step 605, the rate control process 112 sets the value of the source stamped rate field (SSR) for the virtual circuit on which the end to end control cell was received to the value of the demand field for that virtual circuit. In step 605 the value of the source allowed transmission rate (SATR) for that virtual circuit is unchanged.

In step 610 of FIG. 6A, the rate control process 112 compares the value of the stamped rate field (PSR) in end to end control cell received in step 410 to the value of the source stamped rate field 205 for the virtual circuit on which the end to end control cell was received. If the value of the stamped rate field (PSR) in the received end to end control cell is less than or equal to the value of the source stamped rate field (SSR) for that virtual circuit, then step 610 is followed by step 615. If the value of the stamped rate field (PSR) in the received end to end control cell is not less than or equal to the value of the source stamped rate field (SSR) for that virtual circuit, then step 610 is followed by step 620.

In step 620, the rate control process 112 sets the value of the source stamped rate field 205 for the virtual circuit on which the end to end control cell was received to the value of the stamped rate field (PSR) in the received end to end control cell. Step 620 is followed by step 625.

Step 625, as a result of step 610, is only performed when the value in the stamped rate field (PSR) in the received end to end control cell is greater than the value in the source stamped rate field (SSR) in the source data structure. In step 625, the rate control process 112 adjusts the source allowed transmission rate for the virtual circuit on which the end to end control cell was received. There are two alternative embodiments of step 625. The alternative embodiments of step 625 are shown in FIG. 6B and FIG. 6C.

Figure 6B:
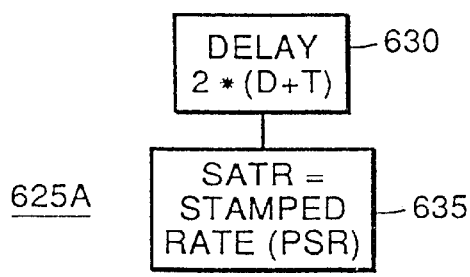
FIG. 6B is a diagram showing a first alternative example embodiment 625A of step 625 in FIG. 6A.

FIG. 6B shows a first example embodiment 625A of step 625 as shown in FIG. 6A. As a result of the steps up to step 620, the source end station is able to maintain a current rate estimate in the source stamped rate field (SSR) for each virtual circuit. However, if the source end station simply copies the value of the source stamped rate field (SSR) into the source allowed transmission rate field, this could result in temporary infeasibility of a source allowed transmission rate if a faster virtual circuit raised its source allowed transmission rate value before a slower virtual circuit notified the source end station to lower its source allowed transmission rate value.

The example embodiment 625A causes the source allowed transmission rate to be feasible at all times. In step 630 of the example embodiment 625A the rate control process 112 delays updating the allowed transmission rate for the virtual circuit based on the previously received end to end control cell for a time period equal to 2*(D+T), where D is the value of maximum round trip field 220 in the source data structure shown in FIG. 2. In step 635 of the example embodiment 625A, the rate control process 112 writes the value of the stamped rate field (PSR) of the previously received end to end control cell into the source allowed transmission rate field 210 for that virtual circuit. If during step 630, prior to time period expiring a new end to end control cell is received having Ubit equal to one and stamped rate field (PSR) value below the current value of the source allowed transmission rate field (SATR), then the value of the source allowed transmission rate (SATR) is immediately set to the stamped rate field (PSR) value of the new end to end control cell, and is not subsequently increased at the end of the time period of the delay in step 630. As a result of this policy, any entering virtual circuit will have to wait for 2*(D+T) time before starting a transmission in order to avoid temporary infeasibility.

Figure 6C:
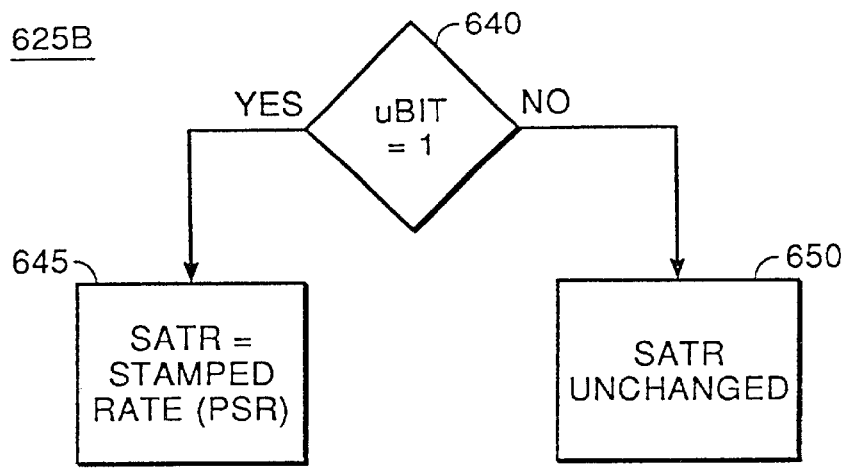
FIG. 6C is a diagram showing a second alternative example embodiment 625B of step 625 in FIG. 6A.

FIG. 6C shows an alternative example embodiment 625B of step 625 as shown in FIG. 6A. The example embodiment 625B is less complex than the example embodiment 625A, and therefore less costly. However, the example embodiment 625B does not ensure that the allowed transmission rate is feasible at all times. In step 640 of the example embodiment 625B of FIG. 6C, the rate control process 112 compares the value of the Ubit in the received end to end control cell to one. If the rate control process 112 determines that the value of the Ubit in the received end to end control cell is equal to one, then step 640 is followed by step 645. If the rate control process 112 determines that the value of the Ubit in the received end to end control cell is not equal to one, then step 640 is followed by step 650.

In step 645 the rate control process 112 immediately writes the value from the stamped rate field (PSR) in the received end to end control cell into the source allowed transmission rate field 210 (SATR) for that virtual circuit. In step 650 the rate control process 112 leaves the value of the source allowed transmission rate field 210 unmodified. In an optimized embodiment of the example embodiment 625B as shown in FIG. 6C, the step 645 is combined in the step 605 as shown in FIG. 6A, and the step 650 is performed in the step 625 as shown in FIG. 6A. Thus in the optimized embodiment of the example embodiment 625B as shown in FIG. 6C, the step of determining the value of the Ubit is performed only once in step 600 as shown in FIG. 6A, and step 640 is not required.

Figure 7:
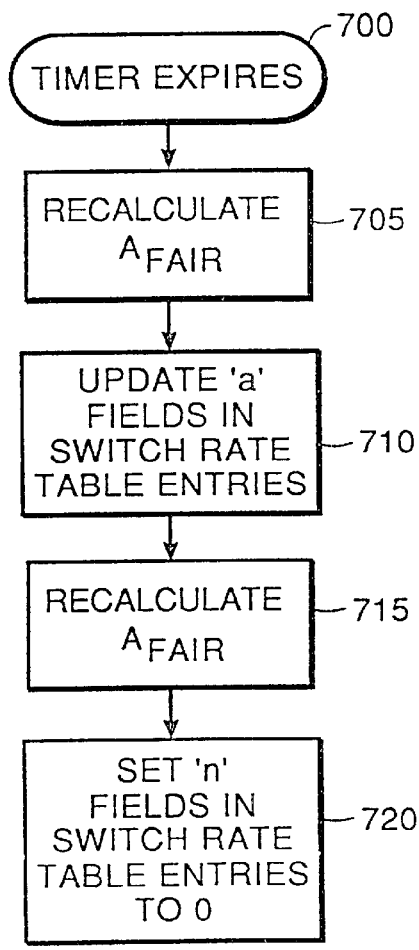
FIG. 7 is a diagram showing steps performed by an example embodiment of a periodic update process in a networking switch.

FIG. 7 is a diagram showing steps performed by an example embodiment of periodic update process 134 as shown in switch 102 in FIG. 1. In step 700 of FIG. 7, the periodic update process 134 detects the expiration of the timer 136 as shown in FIG. 1. The duration of the timer 136 is T. As noted above, the duration of the timer 116 shown in the switch 102 in FIG. 1 is also equal to T.

Following step 700, in step 705, the periodic update process 134 recalculates the value of the A-fair variable 127 as shown in FIG. 1. The value of the A-fair variable 127 represents a fair share of the bandwidth available at the switch for those virtual circuits that are not yet known to be "bottle-necked". The equation for recalculating the value of the A-fair variable 127 is: where:

$$A\text{-}fair = \frac{C - \sum_{i=0}^{255} n_i * a_i}{\sum_{i=0}^{255} n_i - \sum_{i=0}^{255} n_i * a_i}$$

C is the total link capacity of the switch, and n and a are values from the n and a fields of the switch rate table entries as shown in FIG. 3.

Because the value resulting from the above equation may be somewhere between the discrete rates corresponding with entries in the switch rate table, the resulting value is rounded to the closest smaller discrete rate corresponding with an entry in the switch rate table.

Following step 705, in step 710, the periodic update process 134 updates the 'a' fields in the switch rate table entries. In a first example embodiment, step 710 updates the 'a' fields as follows:
FOR j=0 to j=255 DO
  r(j)=2 exp(0.125*j)
  IF (r(j) greater than A-fair) AND (a(j)=1)
    then SET a(j)=0
In an alternative embodiment, step 710 may updates the 'a' fields as follows:
Fair_Index=8*$\log_2$(A-fair)
FOR j=0 to j=255 DO
  IF (j>Fair_Index) AND (a(j)=1)
    then SET a(j)=0

Following step 710, in step 715, the periodic update process 134 recalculates A-fair a second time using the above given algorithm. Note that step 715 operates on the modified values of the 'a' field in the entries of the switch rate table as shown in FIG. 3. After step 715, the periodic update process 134 sets the value of the 'n' fields in all entries of the switch rate table as shown in FIG. 3 to zero.

Figure 8:
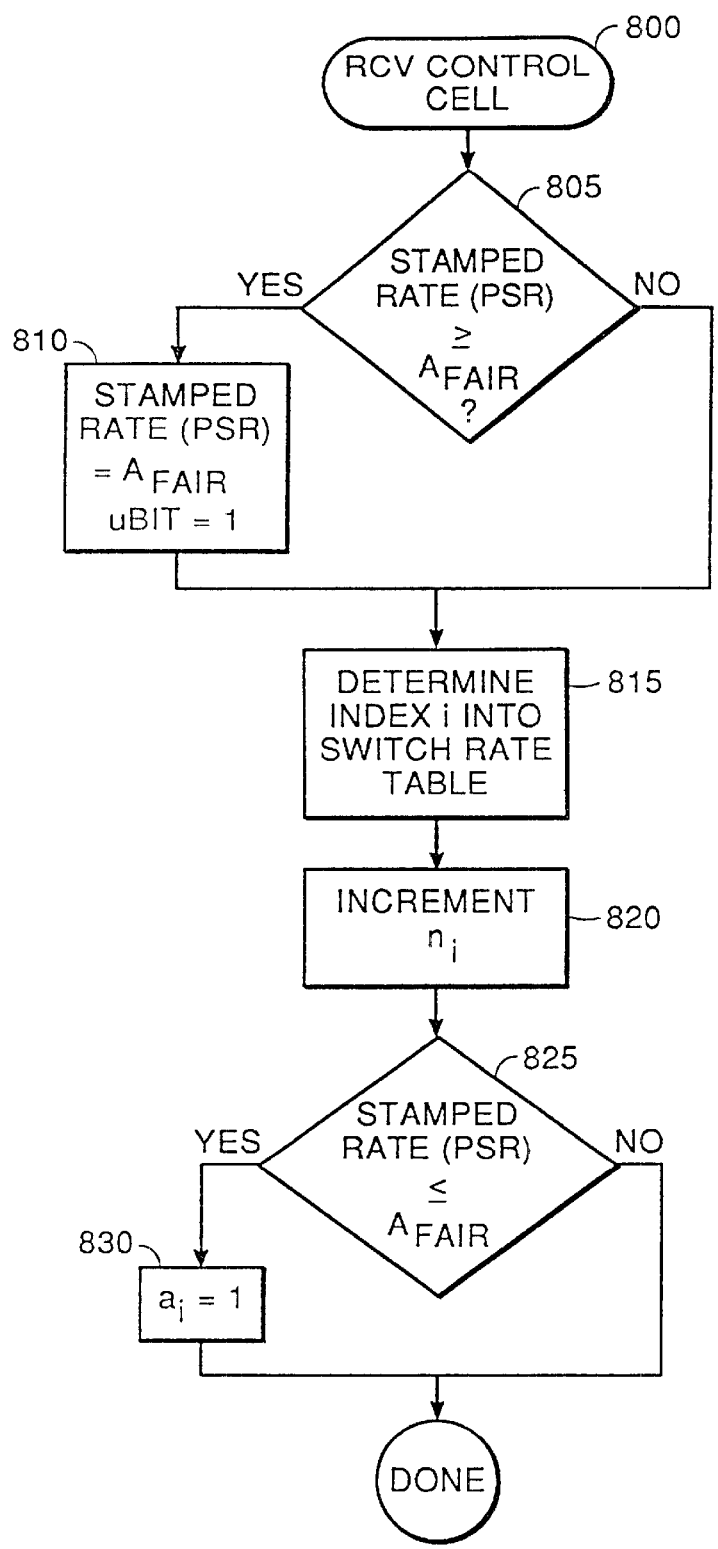
FIG. 8 is a diagram of steps performed by an example embodiment of a rate control information process in a networking switch.

FIG. 8 shows the steps performed by an example embodiment of rate control information process 132 as shown in switch 102 in FIG. 1. In step 800 the rate control information process 132 receives an end to end control cell. Following step 800, in step 805 the rate control information process 132 compares the value of the stamped rate field (PSR) in the received end to end control cell with the value of the A-fair variable 127 in the switch 102. If the value of the stamped rate field (PSR) in the received end to end control cell is greater than or equal to the value of the A-fair variable 127 in the switch 102, step 805 is followed by step 810. Otherwise, step 805 is followed by step 815.

In step 810 the rate control information process 132 sets the value of the stamped rate field (PSR) in the received end to end control cell to the value of the A-fair variable 127, and sets the Ubit in the received end to end control cell to one. Step 810 is followed by step 815. In step 815 the rate control information process 132 determines the index 'i' into the switch rate table for the switch rate table entry corresponding to the transmission rate indicated by the value of the stamped rate field (PSR) in the received end to end control cell. Following step 815, the rate control information process 132 increments the counter field $n_i$ in the switch rate table.

Following step 820, in step 825, the rate control information process 132 compares the value of the stamped rate field (PSR) in the received end to end control cell with the value of the A-fair variable. If the value of the stamped rate field (PSR) in the received end to end control cell is less than or equal to the value of the A-fair variable, then step 825 is followed by step 830. In step 830 the rate control information process 132 uses the index 'i' determined in step 820 to set the $a_i$ bit in the switch rate table as shown in FIG. 3.

Following the steps shown in FIG. 8, the rate control information process 132 forwards the received end to end control cell to the next node of the route for that virtual circuit. When the end to end control cell is eventually received by the destination end station 104, the control cell return process 144 returns the end to end control cell to the source end station 100.

FIG. 9 is a diagram showing an example of fields within an end to end control cell. As noted above, end to end control cells are sent periodically by the source end station 100. End to end control packets are sent at high priority. One end to end control cell is transmitted for each virtual circuit every time period T, where T is known to all stations and switches, and is the duration of the timers 116 and 136 as shown in FIG. 1. The period T is predetermined such that control traffic is always feasible. As a result of the periodic transmission of end to end control cells over each virtual circuit, exactly one end to end control cell is received at each switch per virtual circuit per time period T. This allows a switch to count the number of virtual circuits with a given encoded rate each time period T, rather than maintaining the transmission rate of each virtual circuit.

FIG. 9 shows a field used for rate encoding, specifically the stamped rate field (PSR) 900. Also shown in FIG. 9 is a Ubit 905. The rate control process 112 in the source end station writes the value of the stamped rate field (PSR) 900 and the Ubit 905 as described in FIG. 5. In a first example embodiment, the stamped rate field (PSR) 900 is written as one of the set of permitted discrete transmission rates. In an alternative example embodiment, the stamped rate field (PSR) 900 is encoded as an index into the switch rate table. In the alternative example embodiment, the value of the stamped rate field is equal to an index 'i', determined by the equation 'i'=8*$\log_2$Rate, where Rate is one of the set of permitted discrete transmission rates.

HYBRID FLOW CONTROL METHODS

Hybrid flow control methods are those methods of this invention where end-to-end flow control methods are used to calculate a transmission rate for each virtual circuit, and these rates are then used to allocate buffers for a hop-by-hop flow control method. The hop-by-hop flow control method is typically implemented by a credit based mechanism.

The hop-by-hop flow control method requires allocation of buffers for each virtual circuit. The transmission rate for each virtual circuit is needed in order to calculate the amount of memory which must be allocated for buffers for a particular virtual circuit. Past methods for dynamic buffer allocation have attempted to measure an observed transmission rate for each virtual circuit. Measurement of observed transmission rates is uncertain for a number of reasons, any chosen observation time period may be arbitrary, and the source may transmit bits in bursts, so that any observation time period gives instantaneous results which bear little or no relation to the average transmission rate on that virtual circuit. If a long observation time period is chosen, then the system becomes unresponsive to changes in network conditions.

FEASIBLE TRANSMISSION RATES FOR SOURCE STATIONS

Figure 10:
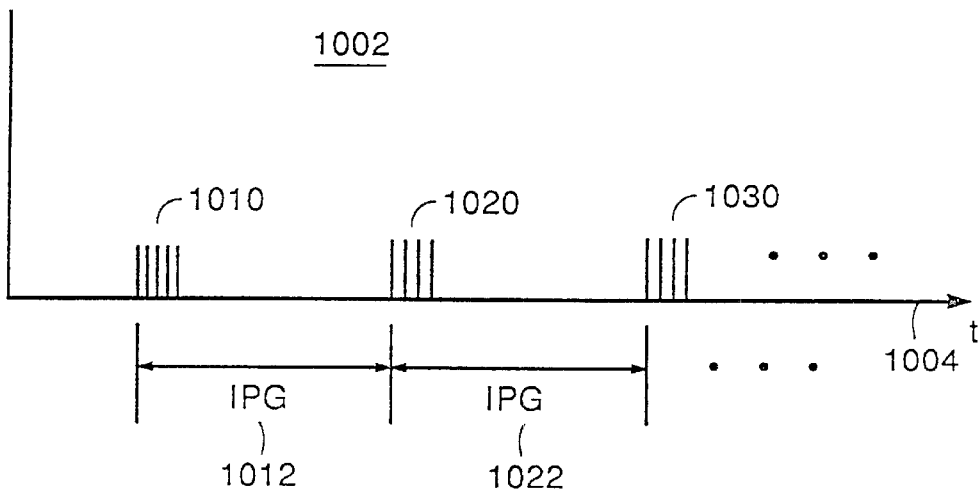
FIG. 10 is a timing diagram showing spacing for feasible rates.

In discussing hybrid flow control methods, it is first helpful to more closely examine a "feasible transmission rate" as determined by the methods of FIG. 1–FIG. 9. The feasible transmission rates for the source stations of a network are defined such that the sum of rates of all virtual circuits going through any link of the network does not exceed the capacity of that link, for all links of the network. Turning now to FIG. 10, there is shown a timing diagram 1002. The time axis 1004 is used to illustrate spacing of cells transmitted by a source station. A first burst of bytes 1010 is illustrated. The number of bytes in burst 1010 is determined by the number of cells transmitted in a back-to-back fashion by the source station. For example, if only one ATM cell is transmitted in burst 1010, then there will be 53 bytes transmitted, where each byte is 8 bits, for a total of 8*53 bits or 424 bits. As a further example, if N cells are transmitted during burst 1010, then the number of bits transmitted during the burst 1010 will N*8*53, or N times 424 bits.

After transmission of burst 1010 the source station waits for a time interval indicated as IPG 1012. IPG is an acronym derived from Inter Packet Gap. After time period IPG 1012, a next burst 1020 is transmitted by the source station. After a waiting time period IPG 1022 the next burst 1030 is transmitted by the source station, and so on.

The feasible rate calculated as illustrated by FIG. 1–FIG. 9 is related to the number of bits in a burst and the IPG, or inter packet gap, the time spacing of cells, as follows. The following expression gives the "average" transmission rate during a time interval of IPG:

Average Rate=(Number of Burst Bits)/IPG bits/sec

The "Average Rate" is expressed in bits per second. The interpacket gap IPG is expressed in seconds. The "Number of Burst Bits" is the number of bits transmitted by a source station during a burst such as burst 1010, 1020, 1030, . . . etc.

The symbol BS, burst size, will be used to represent the number of cells transmitted in a burst by a source station. If BS ATM cells of 53 bytes each are transmitted during a burst, then:

Average Rate=(BS*8*53)/IPG bits/sec

In operation, the "Average Rate" is set equal to the desired "Feasible Rate", where the desired feasible rate is calculated using the methods of FIG. 1–FIG. 9.

The inter packet gap IPG is then calculated using the above expression using the desired feasible rate for the average rate, as follows:

Desired Feasible Rate=(BS*8*53)/IPG bits/sec

The IPG calculated from this expression is the burst spacing which a source station must observe in order to transmit at "feasible rates".

Buffer allocation at intermediate nodes must be sufficient to hold BS bytes for each virtual circuit, because there is no coordination between source stations. In a worst case situation all virtual circuits have cells arrive at a switch at substantially the same time, each source station transmits BS cells in a burst, and so each switch must be able to buffer BS cells for each virtual circuit passing through the switch.

CREDIT BASED FLOW CONTROL, END-TO-END RATE BUFFER ALLOCATION

Credit based flow control using buffer allocation computed from end-to-end rate control methods for each virtual circuit will now be explained.

Figure 11:
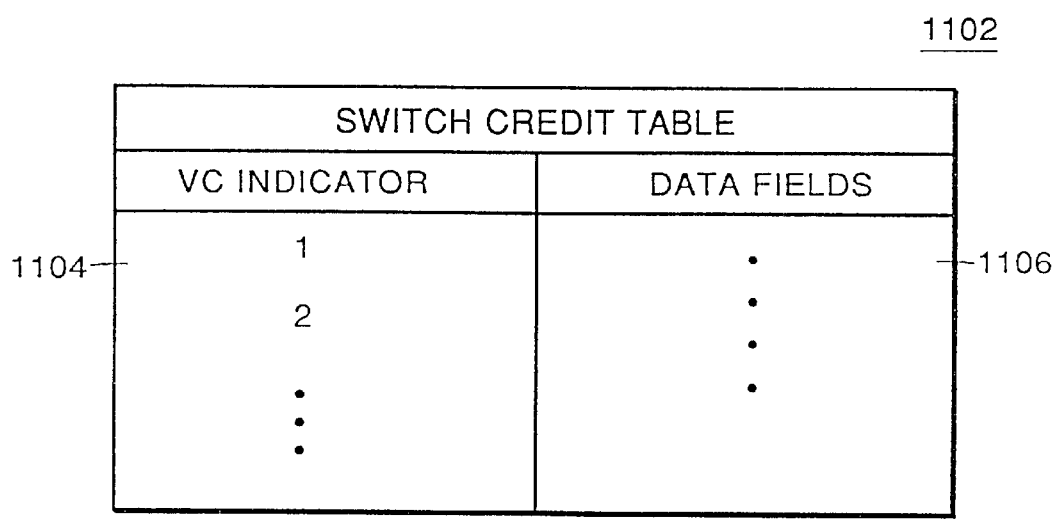
FIG. 11 is a Switch Credit Table.

Turning now to FIG. 11, there is illustrated a Switch Credit Table 1102. Each active virtual circuit passing through the switch has a virtual circuit indicator, and the virtual circuit indicator is entered into field 1104. Each virtual circuit has data maintained in data field 1106.

Turning now to FIG. 12, there is illustrated a number of data fields data maintained in data field 1106 of Switch Credit Table 1102. Field 1202 contains the Recorded Rate, represented by R. The Recorded rate is the last seen stamped rate seen in an end-to-end control packet as shown in FIG. 13 hereinbelow. The value of R is initialized to 0.

Field 1204 contains the Actual Buffer Allocation, represented by BA. The Actual Buffer Allocation is the memory allocation for a given virtual circuit. The value of BA is initialized to N2. The value of N2 is stored in field 1226.

The value of N2 is the minimal buffer allocation available per virtual circuit. The value of N2 defines the minimal per virtual circuit transmission rate to be:

minimum rate=(N2*8*53)/IPG bits/sec.

Here IPG may be the individual hop's round trip time. This round trip time includes the round trip propagation time of the link plus any component delay at the upstream and downstream nodes, and the time required to forward N2 cells by the downstream node.

The value of N2 is chosen in such a way that minimum transmission rates are always feasible.

Field 1206 contains the Virtual Buffer Allocation VBA. The virtual buffer memory allocation for a virtual circuit is to allow for memory to be used in overbooking. The value of VBA is initialized to the sum of BA and N2. The value of VBA is the same as BA in field 1204 if no overbooking is used.

Field 1208 contains the buffer used value, BU. BU is the actual number of cells queued for the virtual circuit. The value of BU is initialized to 0.

Field 1220 contains the Total number of data cells transmitted downstream, NTx. The value of NTx is initialized to 0. The NTx variable records the cumulative number of data cells forwarded downstream in the virtual circuit. The value of NTx is initialized at a major event such as boot up of the switch, and so records the number of data cells transmitted during a very long time.

Field 1222 contains the total number of data cells received from the upstream node, and is represented by the symbol NRx. The value of NRx is initialized to 0.

Field 1224 contains the Credit Balance, represented by the symbol CB. The Credit Balance CB is the number of credits available for the switch to forward cells to the downstream node. The value of CB is initialized to N2.

Field 1226 contains the minimum buffer allocation N2. The value of N2 is discussed hereinabove with reference to field 1206.

Field 1228 contains the Round Trip Time of the outgoing link, represented by the symbol RTT. This quantity must be set in response to the physical length of the outgoing link and the round trip delay of the downstream node.

Field 1240 contains the bandwidth of the outgoing link, represented by the symbol Bw.

The parameters N2, RTT and Bw are link parameters and need not be maintained on a per virtual circuit basis.

Field 1242 contains the value of the "local counter", and is represented by the symbol n. The value of n is initialized to 0. The value of n is the number of data cells transmitted since the last credit cell was sent upstream.

Turning now to FIG. 13, there is shown the data fields for a control cell for end-to-end flow control with the addition of a field 1310 containing an identifier of the virtual circuit. The control cell data fields for pure end-to-end flow control are given in FIG. 9, and so the corresponding fields in FIG. 13 are labelled accordingly. In FIG. 13 and in FIG. 9, field 900 contains the stamped transmission rate. In FIG. 13 and FIG. 9, field 905 contains the value of the u_bit.

Turning now to FIG. 14, there is shown a field diagram of the data in a credit cell. Field 1410 contains a value of the credit variable CR. Field 1420 contains the identifier for the virtual circuit, represented by the symbol VC_id. The header of a credit cell may, for example, not contain an identifier for the virtual circuit under consideration. Accordingly, the virtual circuit is identified by the contents of VC_id field 1420.

Figure 15:
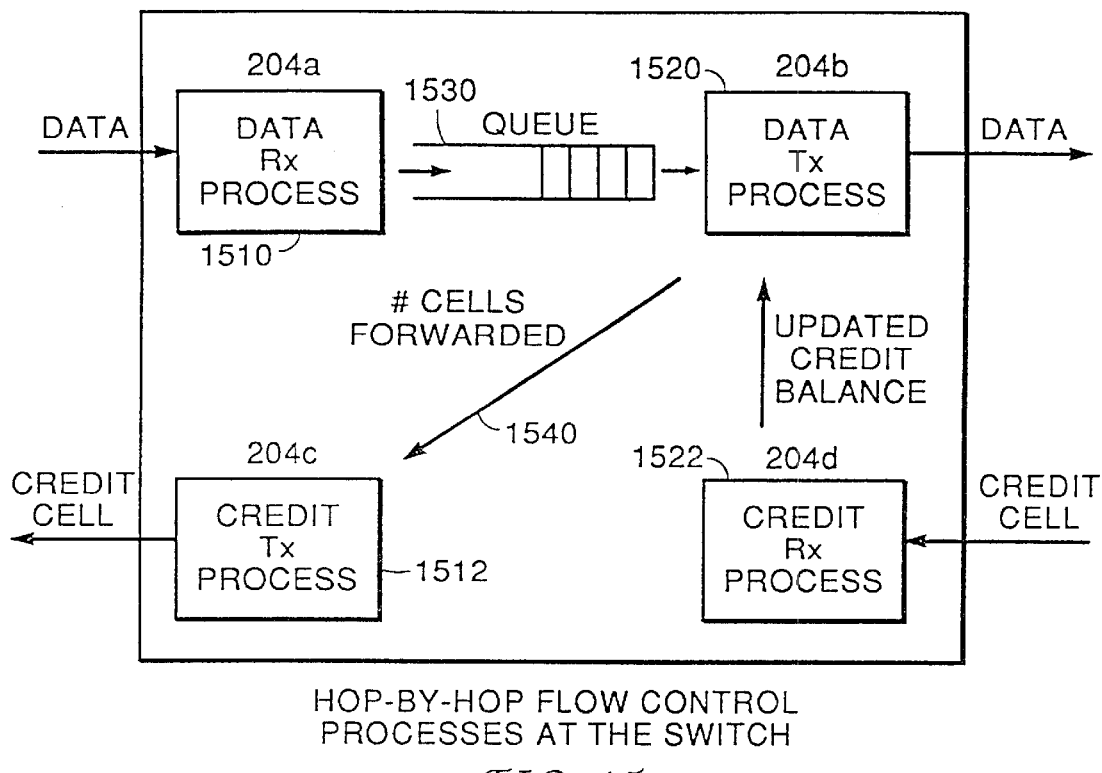
FIG. 15 is a block diagram of processes in a hop-by-hop flow control system.

Turning now to FIG. 15, there are shown hop-by-hop flow control processes. The data receive process 1510, receives data cells from the upstream node. Credit transmit process 1512 transmits credit cells to the upstream node.

Data transmit process 1520 transmits data cells to the downstream node. Credit receive process 1522 receives credit cells from the downstream node. Queue 1530 holds data cells after they have been received by data receive process 1510 and before the data cell has been transmitted to the downstream node by data transmit process 1520.

Each of the four processes 1510, 1512, 1520, and 1522 are asynchronous in their operation. That is, the processes exchange necessary information, each process runs when it has work to do, and each process halts after it has accomplished its task.

Figure 16:
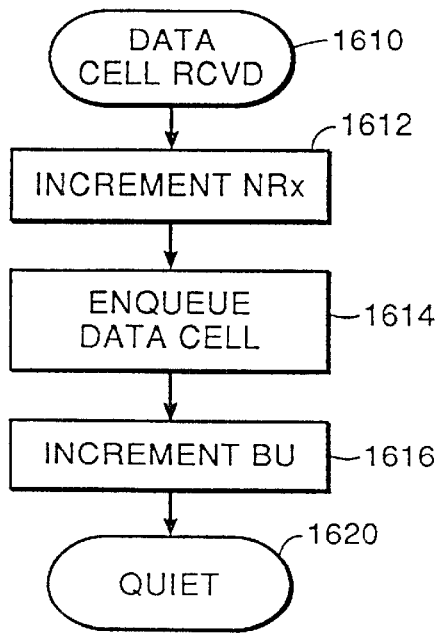
FIG. 16 is a flow diagram of a data receive process.

Turning now to FIG. 16, data receive process 1510 is shown. Upon receipt of a data cell from an upstream node, the process 1510 enters block 1610. The process 1510 then enters block 1612 where the value of NRx is incremented, where NRx is the total number of data cells received from an upstream link on the virtual circuit. The process then goes to block 1614.

At block 1614 the process 1510 transfers the data cell to queue 1530. Queue 1530 is a first in first out, FIFO, queue. FIFO queue 1530 is drained by data transmit process 1520, as will be described in more detail with reference to FIG. 17. The process 1510 then goes to block 1616.

At block 1616 process 1510 increments the value of BU, the count of buffers used and is stored in field 1208 of Switch Credit Table 1102. The process then goes to block 1620.

At block 1620 the process becomes quiet until another data cell is received by the switch, at which time the process begins again at block 1610.

Figure 17:
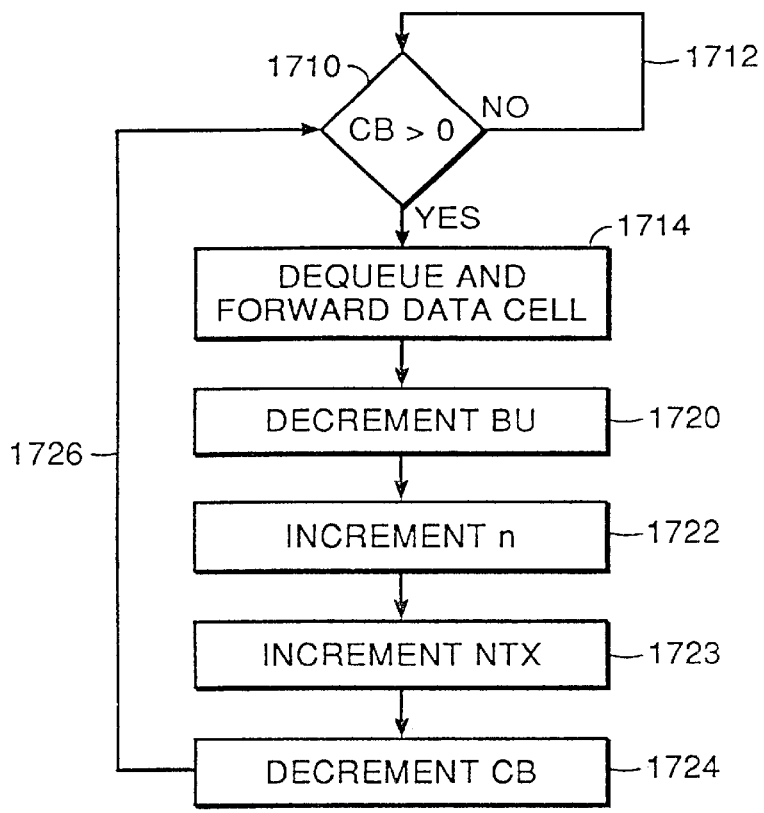
FIG. 17 is a flow diagram of a data transmit process.

Turning now to FIG. 17, there is shown Data Transmit Process 1520. At decision block 1710 the process 1520 tests the credit balance CB, where the value of the credit balance CB is stored in field 1224 of Switch Credit Table 1102. In the event that the value of CB is not greater than zero, 0, the process branches through path 1712 to repeat the loop on decision block 1710. In the event that the test in decision block 1710 finds the credit balance CB to be greater than zero, 0, the process goes to block 1714.

At block 1714 process 1520 dequeues a data cell from FIFO buffer 1530 and transmits the data cell to the downstream node. The process then goes to block 1720.

At block 1720 the process decrements the value of BU, the number of buffers used, which value is stored in field 1208 of Switch Credit Table 1102. The process then goes to block 1722.

At block 1722 the process 1520 increments the value of n, the local counter value stored in field 1242 of Switch Credit Table 1102. The value of n counts the number of data cells transmitted since the last credit cell was sent upstream. The process then goes to block 1723.

At block 1723, process 1520 increments the value of counter NTx, where NTx keeps count of the total number of cells transmitted on the virtual circuit to the downstream link. The value of counter NTx is stored in field 1220 of Switch Credit Table 1102. Process 1520 then proceeds to block 1724.

At block 1724 process 1520 decrements the value of CB, the credit balance stored in field 1224 of Switch Credit Table 1102. The process 1520 then returns along path 1726 to decision block 1710. At decision block 1710, the process again enters the loop of path 1712 where it tests the value of CB until it once again finds the value of CB to be greater than zero, 0.

Figure 18A:
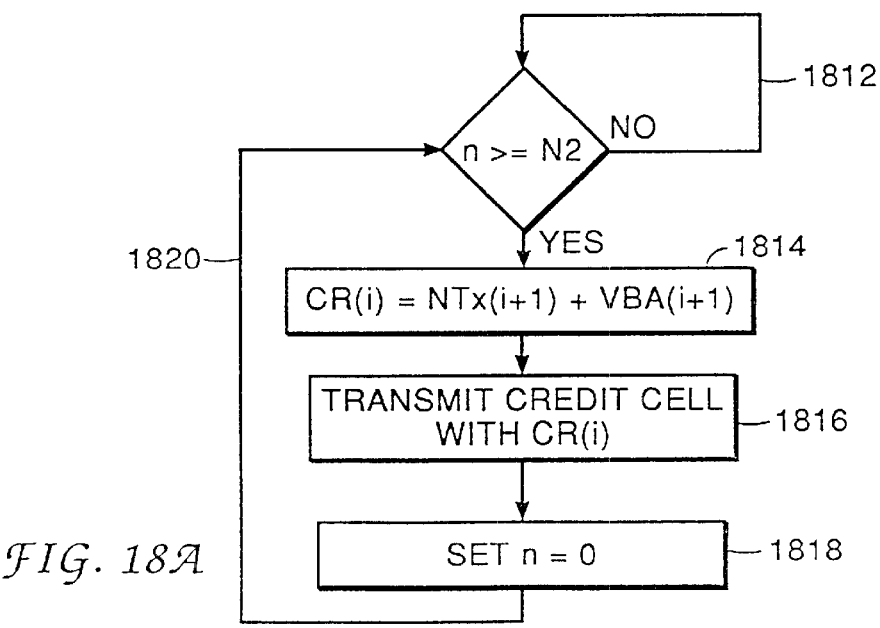
FIG. 18A is a flow diagram of a credit transmit process.

Turning now to FIG. 18A, credit transmit process 1512 is shown. At decision block 1810 the process loops on a test of whether or not the value of n is equal to or greater than N2, where n is stored in field 1242 of Switch Credit Table 1102, and N2 is stored in field 1226 of Switch Credit Table 1102. In the event that n is not equal to or greater than N2, the loop continues around path 1812. In the event that n is equal to or greater than N2, the process goes to block 1814. Decision block 1814 receives the updated value of n from block 1722 in FIG. 17, when n is incremented by the data transmit process 1520, as shown by arrow 1540 in FIG. 15.

Figure 18B:
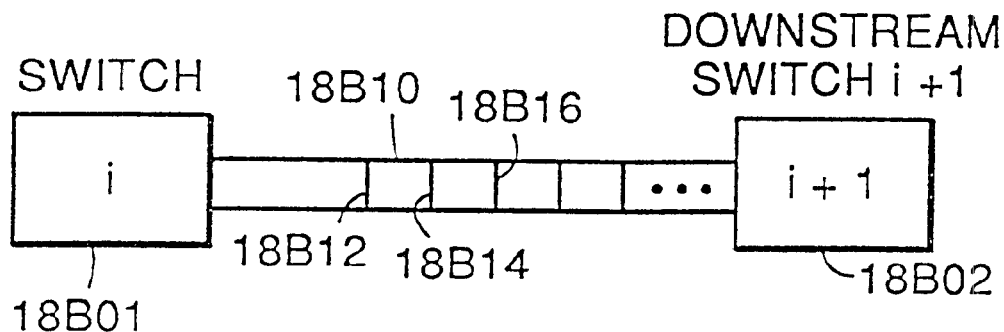
FIG. 18B is a block diagram of two switches and a link therebetween.

Before continuing with a discussion of block 1814, we turn to FIG. 18B to more clearly explain the transfer of a credit balance from a downstream node to an upstream node. As shown in FIG. 18B, switch "i" 18B01 is the upstream switch. Switch "i+1" 18B02 is the downstream switch. Link 18B10 transmits data cells from switch "i" 18B01 to switch "i+1" 18B02. Data cells in flight from switch "i" to switch "i+1" are shown by lines 18B12, 18B14, 18B16, . . . etc.

The credit balance is to be better understood, by first referring to one switch, and at that one switch, the number of cells currently queued is given by the expression:

# of cells queued at switch "i"=NRx(i)−NTx(i)

here NRx(i) is the number of cells received by switch "i"; and NTx(i) is the number of cells transmitted by switch "i".

Next we look at the number of cells queued at switch "i+1" AND the number of cells in flight between switch "i" and switch "i+1", which is given by the expression:
cells queued at
switch "1+1"
AND=NTx(i)−NTx(I+1)
cells in flight
between
switch i and switch i+1 here NTx(i) is the number of cells transmitted by switch "i" and NTx(i+1) is the number of cells transmitted by switch "i+1". NTx is measured from a major event such as the time that the switch was booted up. Accordingly, the value of NTx is referred to as an "absolute number".

When switch "i" receives a credit balance CR(i) from the downstream switch, CR(i) is also an absolute number, as calculated in block 1814 by the expression:

$$CR(i)=NTx(i+1)+VBA(i+1).$$

Figure 19:
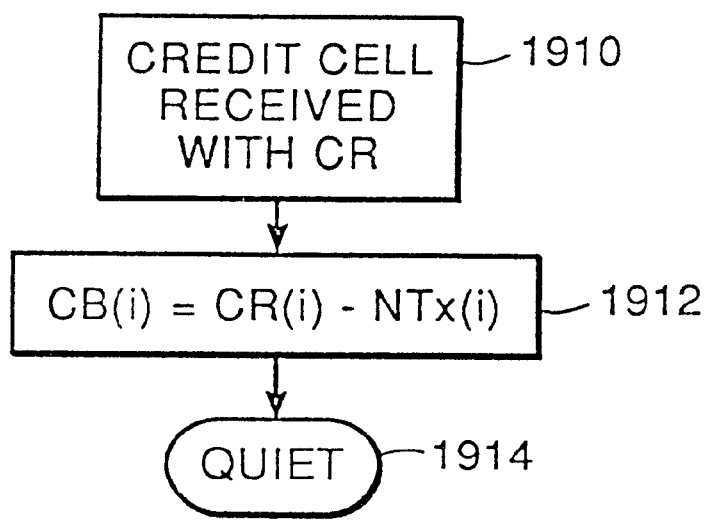
FIG. 19 is a flow diagram of a credit receive process.

The credit balance updated at switch "i" is then calculated by the expression:

$$CB(i)=CR(i)-NTx(i)$$

as shown in block 1912 of FIG. 19.

At block 1814 the value of variable CR is calculated as the number of cells transmitted to the downstream node NTx, where the value of NTx is stored in field 1220 of Switch Credit Table 1102, plus the number of virtual buffers VBA assigned to that virtual circuit. The number of cells transmitted NTx is a long running counter. Also the number of cells received by a node, NRx, stored in field 1222 is a long running counter. For example, both counters NRx and NTx may have been initialized when the switch was booted up and put into service. For example, both counters NRx and NTx may have very large absolute values, such as hundreds of millions of cells, but their difference is a small number. However, the difference, which is important, is the number of cells received by a downstream node and the number of cells transmitted by an upstream node, as will be made clear with reference to the following discussion of the credit receive process 1512 with reference to FIG. 19. Their difference, plus a number of virtual buffers VBA to be discussed hereinbelow, is the number of cells that FIFO queue 1530 has enough buffers to store, for the particular virtual circuit. Process 1512 then proceeds to block 1816.

At block 1816, process 1512 transmits a credit cell, as shown in FIG. 14, to the upstream node. Process 1512 then goes to block 1818.

At block 1818 the value of local counter n is set to zero, 0, and the result stored in field 1242 of Switch Credit Table 1102. Upon completing the task of block 1818, process 1512 then returns along path 1820 to decision block 1810, where it again begins looping to test the value of n against the value of N2.

Turning now to FIG. 19 there is shown credit receive process 1522. At block 1910 the processes recognizes that a credit cell has been received from a downstream node. The credit cell relates to the virtual circuit identified by field 1420 of the credit cell, as shown in FIG. 14. The credit cell receive process then goes to block 1912.

At block 1912 the credit balance is calculated, and is then stored in field 1224 of Switch Credit Table 1102. The value of CB is calculated as the value of variable CR as read from field 1410 of the credit cell, less the value of NTX of the upstream node. At block 1912, the number of cells transmitted by the upstream node NTx is subtracted from the credit received from the downstream node from block 1814. Process 1522 then goes to block 1914, where the process becomes quiet until another credit cell is received, at which time the process becomes active again at block 1910.

Figure 20:
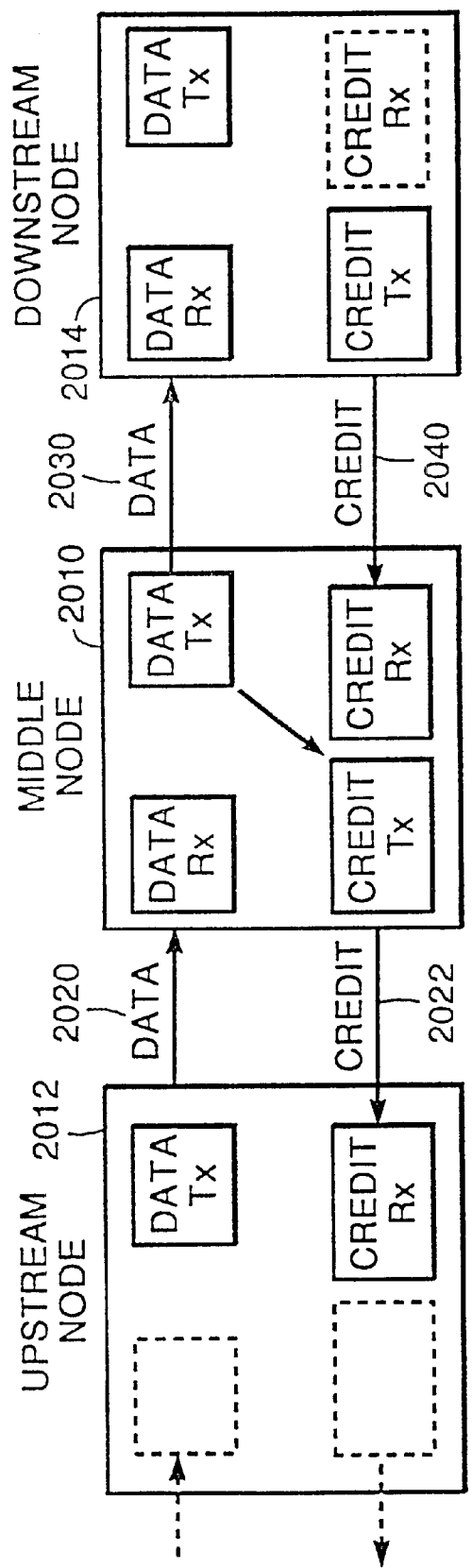
FIG. 20 is a block diagram of nodes employing hop-by-hop credit based flow control.

Turning now to FIG. 20, there is shown an interaction between three nodes implementing a credit based flow control method. The middle node 2010 is a switch. Upstream node 2012 and downstream node 2014 may either be a switch or a station. Upstream node 2012 may be a source station. Downstream node 2014 may be a destination station.

Upstream node 2012 transmits data cells to middle node 2010 along data path 2020 In return middle node 2010 transmits credit cells of FIG. 9 to upstream node 2012 along credit path 2022. The credit balance held by middle node 2010 must depend upon, among other parameters: the number of data cells transmitted from upstream node 2012 to middle node 2010, which data cells occupy buffers in middle node 2010; and also, on the draining of buffers in middle node 2010, and these buffers in middle node 2010 are drained by transmission of data cells from middle node 2010 to downstream node 2014 along data path 2030. Middle node 2010 receives a credit cell from downstream node 2014 along credit path 2040. The number of credits in middle node 2010 determines the rate at which middle node 2010 can transmit data cells along data path 2030.

In view of FIG. 20, it is seen that all of the nodes and links of a complex network depend on the events that occur at other nodes. If a downstream node becomes faster for some reason, then its queues 1530 for each virtual circuit will empty out rapidly, and all upstream nodes will be able to transfer data packets more rapidly through the faster node. Conversely, if a downstream node has a failure and cannot transfer packets as rapidly as planned, all of the nodes of the network attempting to pass cells through the node having a failure will become backed up with full queues 1530.

Figure 21:
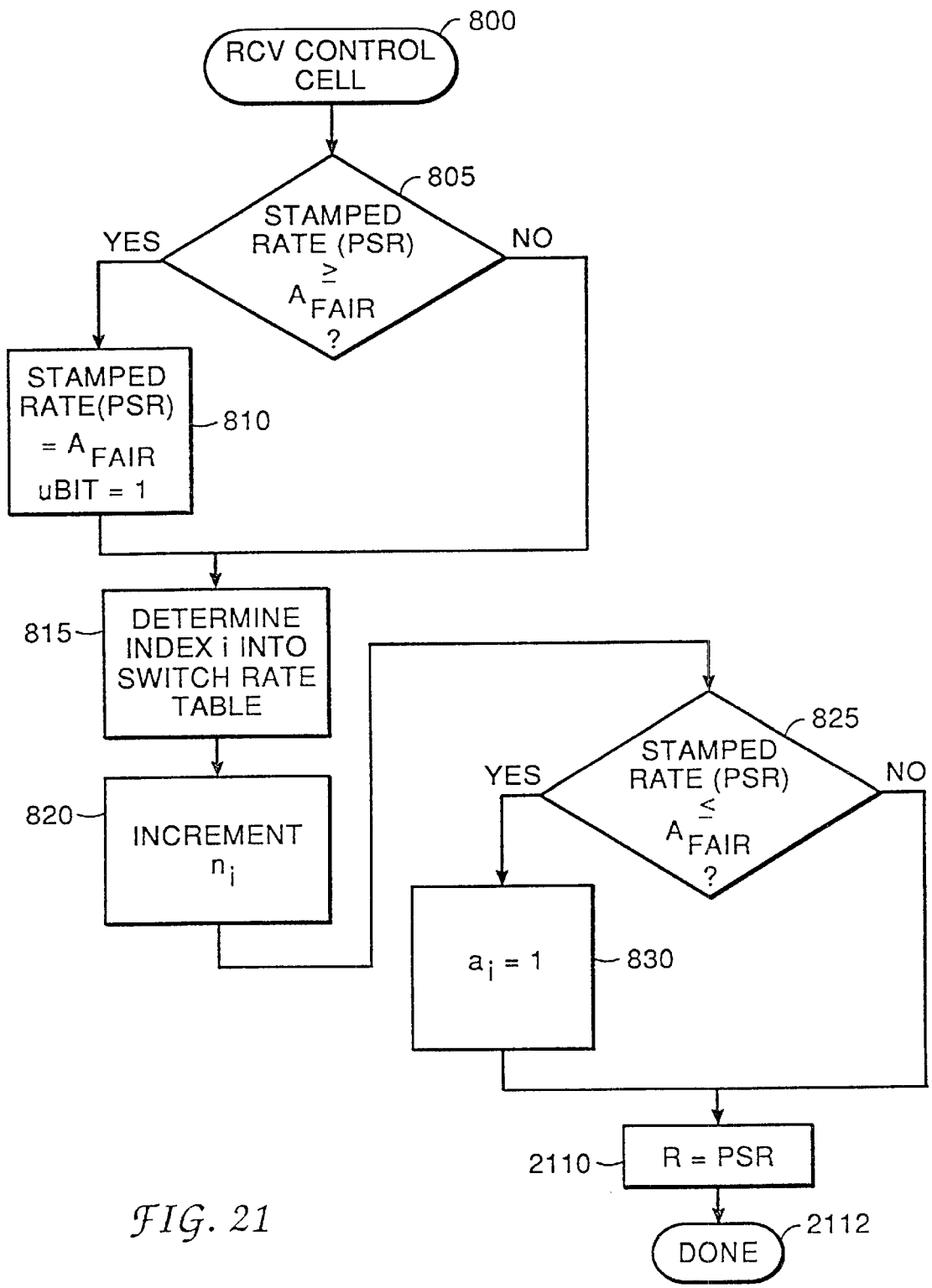
FIG. 21 is a flow diagram of a rate controlled end-to-end flow control process used with a hop-by-hop credit based flow control process.

Turning now to FIG. 21, previous FIG. 8 is reproduced, with the addition of block 2110. Accordingly, FIG. 21 shows the steps of rate control information process in the switch, when hop-by-hop flow control is implemented along with the end-to-end rate control. At block 2110 the process sets the value of R, the latest recorded transmission rate for the virtual circuit and stored in field 1202 of switch Credit Table 1102, to the value of PSR. The value of PSR is read from the end-to-end control cell field 900 as shown in FIG. 9. Each virtual circuit transmits an end-to-end control cell of FIG. 9 during each time period T, and so the value of R stored in field 1202 of Switch Credit Table 1102 is updated once each time period T. The process then proceeds to block 2112 where the process is done.

HYBRID END-TO-END RATE CONTROL WITH HOP-BY-HOP CREDIT CONTROL

The combination of end-to-end rate based flow control with hop-by-hop credit based flow control is referred to as a hybrid flow control method. End-to-end rate based flow control as illustrated in FIG. 1 through FIG. 9 may be combined with hop-by-hop credit based flow control in a number of ways. Three exemplary embodiments of combining the two are illustrated in Table 1.

TABLE 1

Table of Exemplary Embodiments of
Hybrid Flow Control Combinations

| No. | Source Stations | Switches | Buffer Allocations |
|---|---|---|---|
| 1. | hop-by-hop | hop-by-hop | rates from end-to-end rate based flow control |
| 2. | end-to-end set to feasible rates | hop-by-hop | rates from end-to-end rate based flow control |

TABLE 1-continued

Table of Exemplary Embodiments of
Hybrid Flow Control Combinations

| No. | Source Stations | Switches | Buffer Allocations |
|---|---|---|---|
| 3. | end-to-end set to feasible rates plus hop-by-hop with credits permitting actual rate in excess of feasible rates or assigned rates | hop-by-hop | rates from end-to-end rate based flow control |

FIRST EXEMPLARY EMBODIMENT

The First Exemplary Embodiment may be summarized as follows. Switches and source stations are controlled by hop-by-hop flow control, buffer allocation is calculated by end-to-end rate based flow control.

Figure 22:
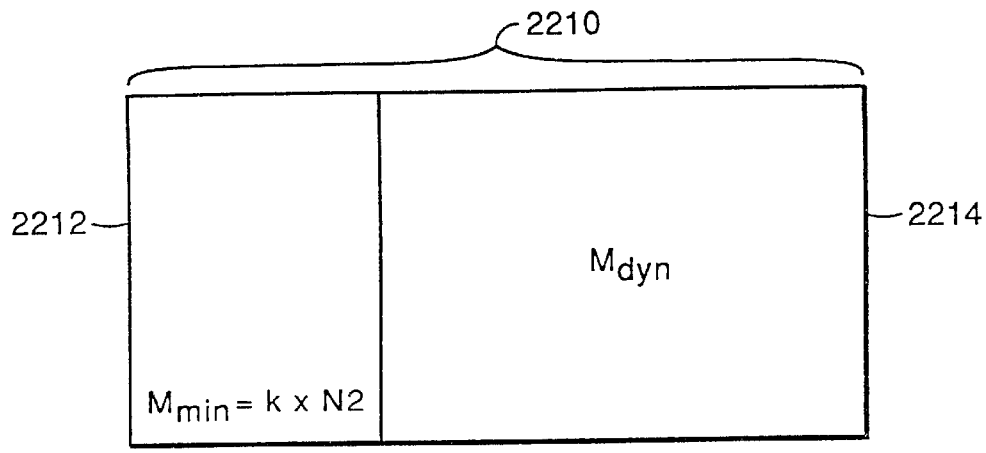
FIG. 22 is a memory allocation diagram.

Turning now to FIG. 22, memory allocation is shown for nodes employing hop-by-hop credit based flow control, where the buffer allocation for each virtual circuit in each node is computed using the transmission rate computed for that virtual circuit using the end-to-end rate based flow control method illustrated in FIG. 1 through FIG. 9, and FIG. 21.

Memory 2210 is broken into two parts, M(minimum) 2212 and M(dynamic) 2214. The minimum memory which must be allocated for buffers is given by N2 for each virtual circuit. Let the number of virtual circuits passing through the outgoing link be represented by K. Then the minimum memory which must be allocated is given by the expression:

$$M(min) = K*N2.$$

The amount of dynamically allocatable memory needed for all virtual circuits for a particular link which must be allocated is given by the expression:

$$M(dynamic) = a*Bw*RTT(link)$$

where "a" is a constant greater than 1, Bw is the bandwidth of the outgoing link, and RTT(link) is the round trip time of the link. The value of "a" must be assigned a rather large value in order to permit the system to respond rapidly to changes in network conditions, and values as high as 12 have been proposed.

The amount of buffers allocated for each virtual circuit i is computed by the expressions:

$$prop(i) = RTT(link)*Bw*(R(i)/SUM(R(j)))$$

$$BA(i) = \{prop(i)/(SUM\ prop(j))*M(dynamic)\} + N2$$

where in these expressions: prop(i) is the proportion of the buffering allocated for the virtual circuit "i";

SUM prop(j) is the sum of the proportions prop(j) summed over all virtual circuits;

RTT(link) is the round trip time of the outgoing link;

the SUM is taken over all virtual circuits passing through the outgoing link so that the expression R(i)/SUM R(j) is the fraction of total rates passing through the outgoing link; and M(dynamic) is the total dynamic memory 2214 allocated for virtual circuits passing through the outgoing link.

The amount of virtual buffer allocated VBA 1206 stored in Switch Credit Table 1102 is computed by the expression:

$$VBA(i) = BA(i)$$

where the index i indicates the virtual circuit.

Advantages of the FIRST EXEMPLARY EMBODIMENT are: (1) the transmission rates R(i) needed for buffer allocation calculations are directly computed from the rate based end-to-end flow control, and therefore the need for rate measurements for each virtual circuit at each switch is eliminated; (2) the convergence time for network rates to become stable after the network configuration and conditions has become stable is better than simple end-to-end rate based flow control as illustrated in FIG. 1 through FIG. 9; (3) convergence is better than hop-by-hop methods which attempt to measure rates in each virtual circuit. A disadvantage is that large values of "a", and consequently large amounts of buffer allocation must be used in order to accommodate transients in network conditions.

SECOND EXEMPLARY EMBODIMENT

The Second Exemplary Embodiment may be summarized as follows. Source stations are controlled by end-to-end rate based flow control, source stations are set to feasible rates. Burst spacing as illustrated in FIG. 10 is enforced at each source station. When a source rate is adjusted to a higher rate, the source is required to wait for two network round trip times as shown in box 630 of FIG. 6B. Switches are controlled by hop-by-hop credit based flow control, with buffer allocation computed by rate based end-to-end rate based flow control.

Figure 23:
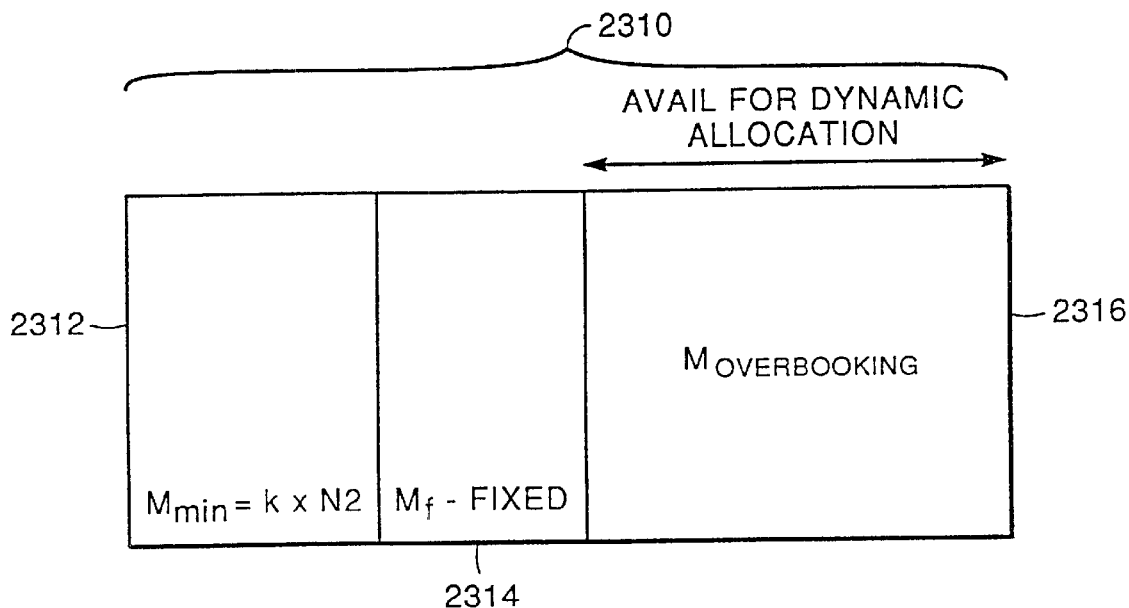
FIG. 23 is a memory allocation diagram.

Turning now to FIG. 23, there is shown memory allocation for a network implementing the SECOND EXEMPLARY EMBODIMENT. Total memory 2310 is allocated for virtual circuit buffers. M(Min) 2312 is allocated as in the same way as in the first exemplary embodiment, and is calculated by the expression:

$$M(Min) = K*N2$$

just as in the first exemplary embodiment.

A fixed amount of memory M(fixed) 2314 must be allocated to accommodate "feasible" source rates, and to accommodate clock skew.

An amount of memory must be allocated for overbooking, where overbooking means permitting the source stations to transmit at rates in excess of the calculated "feasible" rates computed by the end-to-end flow control. Overbooking is possible because the discretization of the transmission rates, coupled with rounding down computed rates to the lower discrete rate, leads to underutilization of the network capacity. Also, transient effects such as virtual circuits not occupying all of their assigned feasible transmission rates, leads to underutilization of the network capacity, etc. The amount of overbooking memory M(overbooking) 2316 allocated is computed by the expression:

$$M(overbooking) = b*Bw*RTT(link)$$

In this expression: Bw is again the bandwidth of the outgoing link; RTT(link) is again the round trip time of the outgoing link; and, "b" is an "overbooking parameter". Typically "b" has a value between 0 and 1.

The amount of memory available for dynamic allocation is M(overbooking), and so dynamic memory allocation for each virtual circuit is computed by the expression:

$$BA(i)=(R(i)/SUM(R(j)))*M(dynamic)+N2$$

with M(dynamic) set equal to M(overbooking) computed above.

The virtual buffer VBA stored in field 1206 of the of the Switch Credit Table 1102 is computed by the expression:

$$VBA(i)=BA(i)+\{RTT(link)*R(i)\}$$

where as before, VBA(i) is the virtual buffer allocation for virtual circuit "i", BA(i) is the buffer allocation computed above; RTT(link) is the outgoing link round trip time; and, R(i) is the recorded rate from field 1202 of Switch Credit Table 1102 for virtual circuit "i".

An advantage of the second exemplary embodiment over the first exemplary embodiment is that the amount of memory needed for overbooking M(overbooking) is only the incremental buffer memory needed for rates in excess of the feasible rates, and is much smaller than the amount computed by the parameter "a" needed for the first exemplary embodiment.

Using the method of the second exemplary embodiment the sources are required to smooth out their traffic, as illustrated with reference to FIG. 10.

THIRD EXEMPLARY EMBODIMENT

The Third Exemplary Embodiment may be summarized as follows. Source stations are controlled by both: end-to-end rate based flow control and source stations are set to feasible rates; and in addition source stations are further controlled by hop-by-hop credit based flow control such that if the credit allowance exceeds the feasible rate then the source may send more cells based on the credits. Switches are controlled by hop-by-hop credit based flow control, with buffer allocation computed using end-to-end rate based flow control.

In the third exemplary embodiment transient response to new source stations coming on line is better. The buffer allocations are the same as in the second exemplary embodiment. The third exemplary embodiment method is more aggressive, in that if a boundary switch can allocate credits to a newly starting source station, then the source station can start before the system assigns a feasible rate to the new source station. The new source station can then start transmitting before the feasible rate is assigned.

Furthermore, when a source rate is adjusted to a higher rate, the source is not required to wait for two network round trip times as shown in box 630 of FIG. 6B, as required by the second exemplary embodiment. Thus, the sources may be more aggressive, and depend upon the hop-by-hop flow control to prevent overflowing of buffers at the downstream switches.

While the invention has been described with reference to specific example embodiments, the description is not meant to be construed in a limiting sense. Various modifications of the disclosed embodiment, as well as other embodiments of the invention, will be apparent to person skilled in the art upon reference to this description. It is therefore contemplated that the appended claims will cover any such modifications or embodiments which fall within the true scope of the invention.

What is claimed is:

1. A system for selecting transmission rates for a plurality of source end stations, the system comprising:

selection means for establishing a feasible transmission rate for each source end station on all established virtual circuits, said feasible rate defined as a transmission rate for each source end station such that cells transmitted in accordance with said feasible rate by each source end station do not require a link capacity in excess of the link capacity for each link in the network; and allocation means in a network switch for allocating buffers by controlling transmission rates using hop-by-hop credit based flow control to achieve source end station transmission rates in excess of said feasible rates.

2. The apparatus as in claim 1 wherein said allocation means further comprises:

means in each network switch for keeping a record of a transmission rate for each virtual circuit psassing through said network switch; and means for allocating buffers to create allocated buffers in said each network switch for a virtual circuit in response to a transmission rate for that virtual circuit and in response to a link length expressed in terms of a pipeline full of cells and in response to an overbooking parameter.

3. The apparatus as in claim 1 further comprising:

credit issuing means for transmitting credits to an upstream node, said credits permitting said upstream node to transmit data cells at a transmission rate in excess of said feasible rate, said credits issued to control transmission of cells in response to a capacity of said allocated buffers.

4. The apparatus as in claim 1 further comprising:

means for controlling said network switches by said hop-by-hop credit based flow control; and means for controlling said source end stations by said hop-by-hop credit based flow control.

5. The apparatus as in claim 1 further comprising:

means for controlling said network switches by said hop-by-hop credit based flow control;

mean for controlling said source end stations by said end-to-end rate based flow control by assigning them operation at said feasible rates; and means for permitting said source end stations to transmit data cells at a rate in excess of said feasible transmission rates by allocating buffers at said network switches, said allocation made in response to said feasible rates.

6. The apparatus as in claim 1 further comprising:

means for controlling said network switches by said hop-by-hop credit based flow control;

means for controlling said source end stations by said end-to-end rate based flow control by assigning them operation at said feasible rates; and means for permitting said source end stations to transmit at a transmission rate in excess of said feasible rates by issuing credits to said source end stations by a downstream network switch.

* * * * *